United States Patent
Rohit Kumar et al.

(10) Patent No.: US 12,008,385 B1
(45) Date of Patent: Jun. 11, 2024

(54) DATA TRANSFER OVER ISOCHRONOUS CHANNELS

(71) Applicant: Amazon Technologies, Inc., Seattle, WA (US)

(72) Inventors: F N U Rohit Kumar, San Jose, CA (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 17/360,959

(22) Filed: Jun. 28, 2021

(51) Int. Cl.
*G06F 9/445* (2018.01)
*G06F 13/10* (2006.01)

(52) U.S. Cl.
CPC ........ *G06F 9/44505* (2013.01); *G06F 13/102* (2013.01)

(58) Field of Classification Search
CPC ............... G06F 9/44505; G06F 13/102; H04L 12/40052; H04L 12/40058
See application file for complete search history.

(56) References Cited

U.S. PATENT DOCUMENTS

| | | | | |
|---|---|---|---|---|
| 2020/0296793 | A1* | 9/2020 | Cheong | H04W 88/06 |
| 2021/0014081 | A1* | 1/2021 | Guo | H04L 12/40019 |
| 2021/0306103 | A1* | 9/2021 | Young | H04L 1/189 |

* cited by examiner

*Primary Examiner* — Idriss N Alrobaye
*Assistant Examiner* — Brooke J Taylor
(74) *Attorney, Agent, or Firm* — Lee & Hayes, P.C.

(57) ABSTRACT

The disclosure describes techniques for the isochronous transfer of data between a central device and one or more peripheral devices. For example, the central device may comprise any type of electronic device that is able to distribute data to peripheral devices using a wireless protocol. The isochronous transfer of data from the central device may provide an efficient method for wirelessly delivering data to multiple peripheral devices in an alternating pattern. In some examples, the isochronous transfer of data may help ensure that the peripheral devices receive timely and successful data transfers, improving the overall performance of the network of devices.

18 Claims, 13 Drawing Sheets

DATA TRANSFER OVER ISOCHRONOUS CHANNELS

BACKGROUND

As computing devices continue to evolve, the amount of computing devices used in everyday life continues to proliferate. Further, as the number of devices increases, so too does the number of makes and/or models of wireless devices in use at any given time. For example, it is now commonplace for a single home to have one or more wireless remotes, ear-based devices (e.g., pairs of in-ear headphones), one or more wireless speakers, etc. For instance, a user may use the ear-based devices to stream music from his or her phone in the morning, while later using a wireless speaker to stream audio from a laptop computer. The array of devices may use Bluetooth or another wireless protocol to connect to another device. However, relatively large data transfers among wireless devices may be difficult to complete, particularly when a data transfer is intended for multiple devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 2 also illustrates instances where the multiple peripheral devices may be grouped for the purposes of receiving the data. Further, the data may be portioned into chunks for isochronous delivery to the peripheral devices of the group.

FIG. 5 also illustrates instances where the multiple peripheral devices may be organized into two groups for the purposes of receiving the data. For instance, the peripheral devices may include different make and/or models of devices, which may require different data for updating firmware. Further, the different data may be divided into portions for isochronous delivery to the peripheral devices of the two groups.

DETAILED DESCRIPTION

Figure 1:
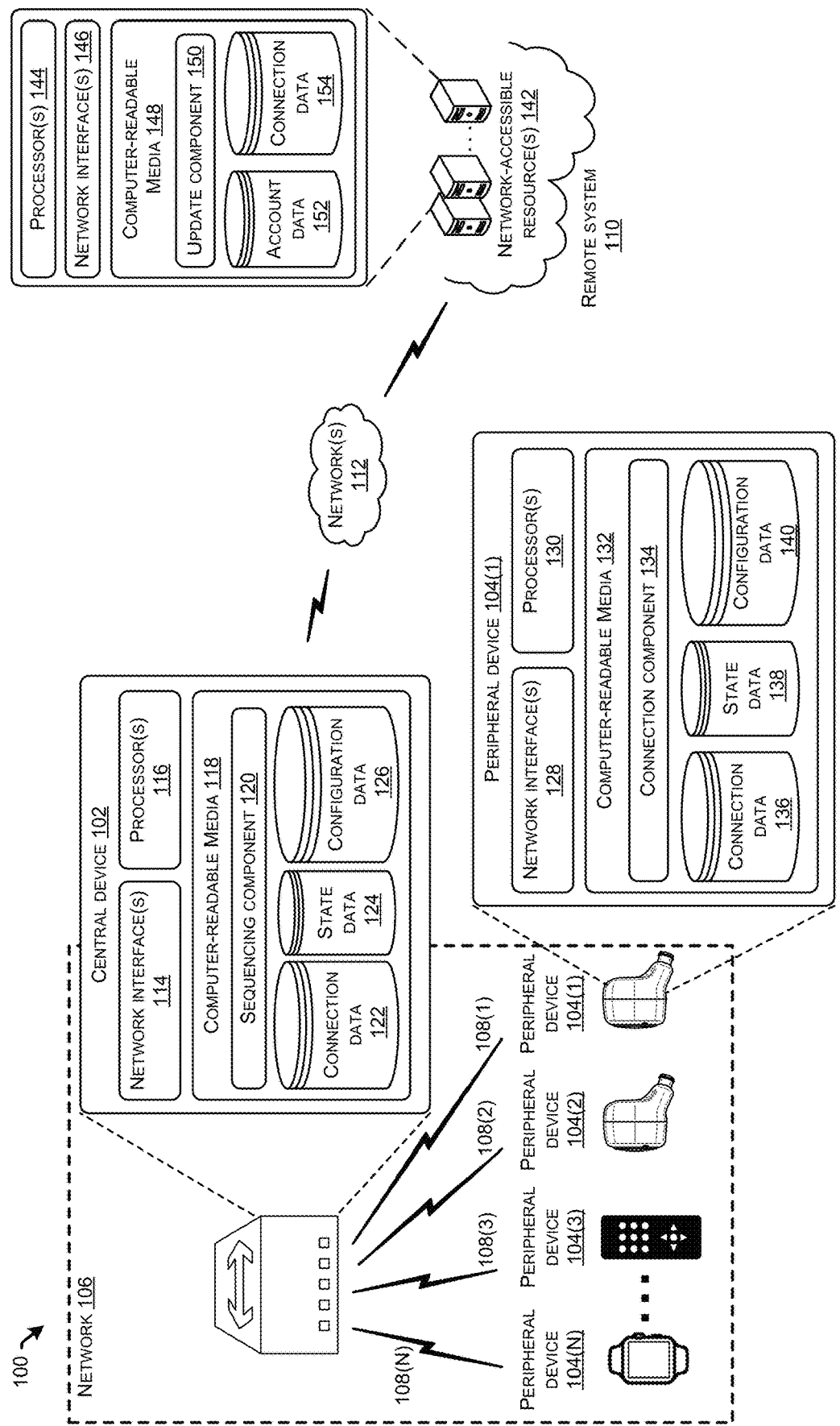
FIG. 1 illustrates a schematic diagram of an illustrative architecture in which a central device is connected to multiple peripheral devices through a wireless network. In some scenarios, the central device may receive data from a remote system. The central device may forward the data to the multiple peripheral devices. In some instances, the central device may use a wireless protocol to send the data to the multiple peripheral devices isochronously, via multiple data links.

The disclosure describes, in part, techniques for the isochronous transfer of data between a central device (e.g., hub, source device) and one or more peripheral devices (e.g., accessory devices, sinks). For example, the central device may comprise any type of electronic device that is able to distribute data to peripheral devices. The central device may be a smart phone, tablet, or home automation hub, for instance. A peripheral device may comprise one or more of a remote, hearable, wearable, speaker, display device, and/or tracker, for instance, or any other electronic device configured to pair and/or connect to other electronic devices (e.g., the central device) over wireless protocols, such as Bluetooth, Zigbee, Zwave, or other personal area networks (PANs). The isochronous transfer of data from the central device may provide an efficient method for delivering data to multiple peripheral devices. In some examples, the isochronous transfer of data may help ensure that the peripheral devices receive timely and successful data transfers from a cloud-based service, improving the overall performance of the network of devices.

In some implementations, a data transfer from a central device to a peripheral device may correspond to an update to software stored on the peripheral device. For instance, peripheral devices may periodically be due to receive an update to firmware to continue to operate efficiently and effectively, to provide new features and capabilities, etc. A firmware update may be accomplished by sending data that comprise configuration data (e.g., a firmware image, update image) to the peripheral device. For instance, the update may be an over the air (OTA) firmware update. The peripheral device may use the new configuration data to overwrite previous (old) configuration data, thereby updating the software of the peripheral device to the new version. While reference may be made to firmware updates and/or configuration data herein, it is to be understood that the present isochronous data transfer techniques may be applied to transfer of any relatively large amount of data from a central device to one or more peripheral devices.

Currently, firmware on a peripheral device may be updated wirelessly using a wireless protocol that is already available on the peripheral device, such as Bluetooth. Note that various versions of any given wireless protocol may be used, such as Bluetooth "Classic," Bluetooth Low Energy (BLE), or another wireless protocol. Such a firmware update process may be referred to as an over-the-air (OTA) firmware update. The update may include identifying a peripheral device that need a firmware update, establishing a data link (e.g., connection) between the central device and the peripheral device, sending the new configuration data to the peripheral device via the data link, and then disconnecting (e.g., terminating) the data link between the central and peripheral devices. For instance, the firmware update may be sent via a Bluetooth Classic BR/EDR link or a BLE 1 Mbps link. Meanwhile, the peripheral device may store the new configuration data in internal storage, confirm that the configuration data are intact, update the firmware, and/or reboot.

The update process must be repeated for each peripheral device that is due for an update. However, the data link may operate with a version of connection intervals, slots, etc., such that some incremental, unused time exists between the transmission of different portions (e.g., chunks) of data. The unused time, or dead space, may accumulate as an inefficiency of the update process for any single peripheral device, let alone a succession of updates for multiple peripheral devices. Therefore, the dead space may cause a significant increase in the total time and/or computing resources needed for multiple updates, especially given the increasing number of peripheral devices in use today.

The disclosed isochronous data transfer techniques include the use of isochronous channels for data transfer to multiple peripheral devices simultaneously, which may substantially reduce the impact of dead space inherent in data link connection intervals. For example, rather than a central device individually updating a first peripheral device, including completion of data transfer of the entire new firmware update and receipt of an acknowledgment of the update having been successful, then proceeding to individually update a second peripheral device, the disclosed techniques allow a central device to update multiple peripheral devices at the same time. Through the use of isochronous channels, a central device may send a portion of a firmware update to a first peripheral device, then send a portion to a second peripheral device right away, then return to second a next portion to the first peripheral device. In this manner the central device has not been held up by any connection interval of the data link to the first peripheral device. In contrast, the central device was able to efficiently begin the update process for the second peripheral device, rather than waiting to complete the entire update process to the first peripheral device. Stated another way, data transfer using isochronous channels may allow the central device to interweave the transmission of portions of data to multiple peripheral devices.

An example wireless protocol for sending firmware updates and/or configuration data from a central device to multiple peripheral devices simultaneously via isochronous channels includes BLE. For instance, BLE version 5.2 introduces isochronous channels (BLE ISOC), enabling time-bound and reliable data transfer between multiple devices. BLE ISOC enables one-to-many data transfer, where a central device can connect to multiple peripherals as part of a group and stream same/different data in real-time simultaneously. The BLE ISOC feature may be leveraged to perform OTA firmware updates on multiple peripherals simultaneously. In some implementations, each peripheral device may be linked to the central device with a data link (e.g., connected isochronous stream (CIS). At least some of the peripheral devices with data links may then be placed in a group (e.g., connected isochronous group (CIG)), for instance. In some examples, a group may be created for peripheral devices with a common make and/or model. Peripheral devices of a same make/model may be due for the same firmware update, therefore the central device may intend to send the same firmware update to all the peripheral devices in the group. The central device may also separate the configuration data into portions (e.g., chunks of data). The central device may then push the configuration data portions to the peripheral devices in the group. The disclosed techniques may also leverage other aspects of wireless protocols to increase throughput and/or decrease overall update time, such as taking advantage of the BLE 2 Mbps PHY where possible. The use of BLE as an example protocol is not meant to be limiting, the disclosed data sequencing techniques may be applied to a variety of other wireless protocols, such as ZigBee, etc.

Note that the present techniques may be useful for peripheral devices that do not have the capability for receiving data via WiFi technology. WiFi may feature the use of multiple data links for transmitting relatively large data files concurrently to multiple devices. However, many peripheral and/or accessory devices, such as hearables and wearable, are not able to support WiFi. Therefore, the connectivity of peripheral devices may not support parallel synchronized links by default. The disclosed techniques remove the restriction related to support of multiple data links through an application algorithm that may enable multiple concurrent data links with existing wireless protocols that are available to the peripheral devices. Further, the disclosed techniques may include additional efficient features, such as synchronizing messages related to data links. For instance, techniques involving the synchronization of ACKs from multiple peripheral devices may contribute to further efficiencies in the data transfer process.

To summarize, the disclosed isochronous data transfer techniques are capable of sending relatively large sets of data from one electronic device to multiple other electronic devices quickly, securely, and simultaneously. The techniques also provide reliable data transfer, to ensure that data are not corrupted. A use-case scenario for the deployment of the disclosed isochronous data transfer techniques includes the delivery of firmware updates from a central device, such as a home automation hub, to peripheral devices, such as remote controls, ear-based devices, etc. The associated firmware updates may be relatively large. A successful update may count on the timely and successful installation of the complete firmware update to any given peripheral device. Therefore, the disclosed techniques may contribute to the continued efficient and effective operation of a network of peripheral devices, improving the user experience.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative architecture in an example environment 100. In some implementations, environment 100 may include a central device 102, and one or more peripheral devices 104. Parentheticals are used after a reference number to distinguish like elements. Use of the reference number without the associated parenthetical is generic to the element. FIG. 1 includes three peripheral devices 104: peripheral devices 104(1) and 104(2) are shown as ear-based devices, peripheral 104(3) is shown as a remote control device, and peripheral device 104(N) is shown as a smart watch. While FIG. 1 illustrates four peripheral devices 106, it is to be appreciated that the central device 102 may communicate with any other number of peripheral devices, and/or other electronic devices, as indicated by the "N" of peripheral device 104(N). Further, the types of central device and/or peripheral devices suggested in FIG. 1 are not meant to be limiting; central and/or peripheral device may comprise any other type of device configured to receive and/or output data and/or other electronic communications consistent with the present concepts.

In some instances, the central device 102 may communicate with the peripheral devices 104 via a wireless network 106, such as a short-range wireless network. The short-range wireless network 106 may utilize any type of wireless protocol, such as Bluetooth, Zigbee, Zwave, and/or the like. The central device 102 may communicate with the peripheral devices 104 via the wireless network 106 using data links 108. In some instances, the data links 108 may be isochronous data links, such as connected isochronous streams (CISs), for example.

In order to communicate with one or more of the peripheral devices 104, the central device 102 may first learn of peripheral devices 104 that it may reach over the short-range wireless network 106. For instance, the illustrated central device 102 may pair with one or more of the peripheral devices 104. In some instances, this operation includes the central device 102 being placed in a "discoverable mode" and the peripheral devices 104 being placed in a pairing mode. After doing so, the peripheral devices 104 may wirelessly locate the central device 102, allowing the devices to "pair" with one another by exchanging certain information. Once the devices are paired, they can quickly establish a connection over the wireless protocol. For instance, central device 102 may establish CIS 108(1) with peripheral device 104(1) and also establish CIS 108(2) with peripheral device 104(2). The CISs 108 may then be used for data transfer between the central device 102 and the peripheral devices 104, for instance.

In response to a pairing, the peripheral device 104, the central device 102, and/or another device may send an indication of the pairing to a remote system 110 over one or more networks 112 (e.g., one or more wired and/or wireless wide area networks). The indication may include identification information of the peripheral device 104 (e.g., MAC address), identification information of the central device 102, capabilities or services offered by the peripheral device 104, capabilities or services offered by the central device 102, and/or the like. Upon receiving this information, the remote system 110 may use the identification information to identify a user account associated with one or both of the peripheral device 104 and/or the central device 102, for instance. The remote system 110 may generate data, such as a public/private key pair, for enabling the peripheral device 104 and the central device 102 to communicate with one another over the wireless protocol. The remote system 110 may also send this data to the central device 102, the peripheral device 104, and/or another device. In some instances, the remote system 110 may send the public/private key pair to the central device 102, along with instruction data to cause the central device 102 to send the public/private key pair to the peripheral device 104. In this manner, the central device 102 may learn of one or more peripheral devices 104 with which to communicate over the short-range wireless network 106.

As illustrated, the central device 102 may include one or more network interfaces 114 (e.g., wired network interface, wireless network interface, etc.), one or more processors 116, and one or more computer-readable media 118. The network interfaces 114 may be configured to communicate over an array of wired and wireless networks and protocols, utilizing short-range wireless networks that utilize one or more wireless protocols, as well as via wide area networks, including networks 106 and/or 112, for instance. The computer-readable media 118 may store, in part, a sequencing component 120, connection data 122, state data 124, configuration data 126, and/or other types of data. The sequencing component 120 may be responsible for operations related to sending data to the peripheral devices 104, which will be explained below in greater detail relative to FIGS. 2-7, for example. The central device 102 may keep at least some of the information regarding the peripheral devices 104 in computer-readable media 118. For instance, connection data 122 may include a list of known peripheral devices 104, or peripheral devices 104 with which the central device 102 has paired at least once. In some examples, the configuration data 126 may include data received from remote system 110 corresponding to firmware updates intended for peripheral devices 104. Configuration data 126 may also include portions of data that represent firmware updates that have been divided into smaller pieces for delivery to the peripheral devices 104, for instance.

A peripheral device 106, meanwhile, may include one or more network interfaces 128 (e.g., wired network interface, wireless network interface, etc.), one or more processors 130, and one or more computer-readable 132. The network interfaces 128 may be configured to communicate over an array of wired and wireless networks and protocols, utilizing short-range wireless networks that utilize one or more wireless protocols, such as network 106. For example, central device 102 may utilize network interfaces 114 to pair via a wireless protocol with a peripheral device 104, which may utilize network interfaces 128 to establish this pairing. The computer-readable media 132 may store, in part, a connection component 134, connection data 136, state data 138, and configuration data 140. The connection component 134 may be responsible for operations related to receiving data from the central device 102, which will be explained below in greater detail relative to FIGS. 2-7, for example. In some scenarios, the configuration data 140 may include data corresponding to old firmware, updated firmware, and/or portions of data representing partial firmware updates at any particular time.

Finally, the remote system 110 may comprise one or more network-accessible resources 142 comprising one or more server computing devices (e.g., a remote server) accessible over the network(s) 112. As illustrated, the network-accessible resources 142 may comprise one or more processors 144, one or more network interfaces 146 (e.g., wired network interface, wireless network interface, etc.), and one or more computer-readable media 148. The network interfaces 146 may be configured to communicate over an array of wired and wireless networks and protocols, including wide area networks, such as network 112. The computer-readable media 148 may store, in part, an update component 150, account data 152, connection data 154, and/or other types of data. The account data 152 may correspond to a user account associated with the central device 102 and/or any peripheral device 104. However, the present isochronous data transfer techniques may be agnostic regarding any particular user.

In addition, the update component 150 may be configured to generate and transmit, over one or more wireless networks, periodic messages indicating that a firmware update is available for a peripheral device 104. The message may include additional information, such as a particular make and/or model of peripheral device 104 for which the firmware update is relevant, a priority list of a particular peripheral device(s) to target with an update, etc. In some examples, a message from the update component 150 may include a firmware update and/or configuration data for updating the firmware of a peripheral device 104. In some implementations, the remote system 110 may push such periodic messages regarding firmware updates, such as to central device 102. In other implementations, central device 102 may query the remote system 1100 regarding potential firmware updates, and the remote system 110 may send the firmware related messages in response to the query.

It is to be appreciated that the network(s) 112 which connect the central device 102 to the remote system 110 may represent an array of wired networks, wireless networks (e.g., WiFi), or combinations thereof. The remote system 110 may generally refer to a network-accessible system—or "cloud-based system"-implemented as a computing infrastructure of processors, storage, software, data access, and so forth that is maintained and accessible via the network(s) 112, such as the Internet. Cloud-based systems may not require end-user knowledge of the physical location and configuration of the system that delivers the services. As illustrated, the remote system 110 may comprise the network-accessible resource(s) 142, such as servers. Multiple of such resources 142 may be included in the remote system 110. As used herein, each of the one or more processors 116, 130, and 144 may include a central processing unit (CPU) for processing data and computer-readable instructions, and computer-readable storage media 118, 132 and 148 may store computer-readable instructions that are executable on the respective processor(s). While not illustrated, the computer-readable media 118, 132, and/or 148 may individually include volatile random access memory (RAM), non-volatile read only memory (ROM), non-volatile magnetoresistive (MRAM) and/or other types of memory. While not illustrated, the computer-readable media 118, 132, and/or 148 may individually include store one or more speech-recognition component(s), such as an automatic speech-recognition (ASR) component or system and a natural-language-understanding (NLU) component or system.

Figure 2:
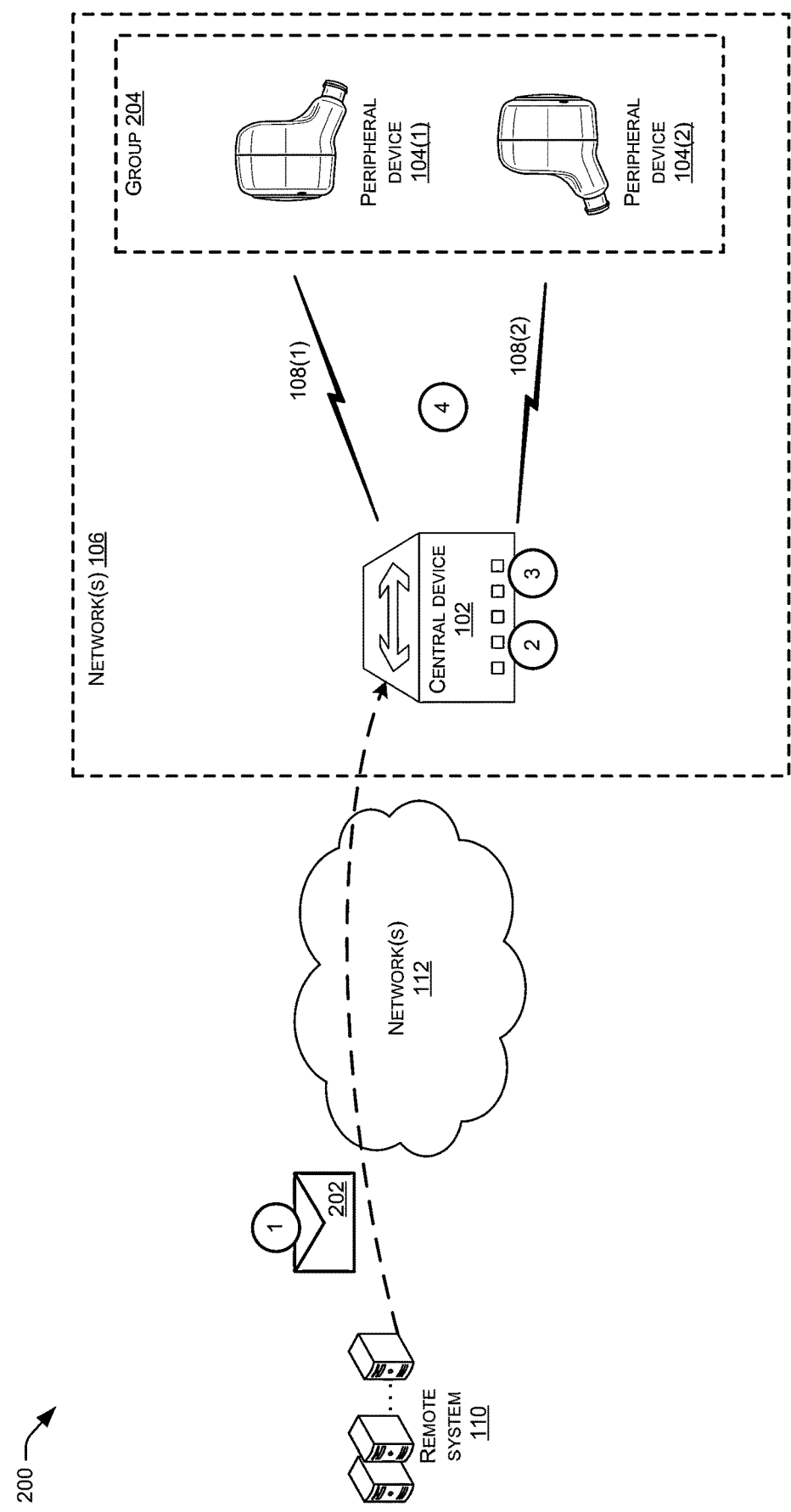
FIG. 2 illustrates a sequence of operations in which a central device receives data from a remote system, and forwards the data to multiple peripheral devices.
Figure 3:
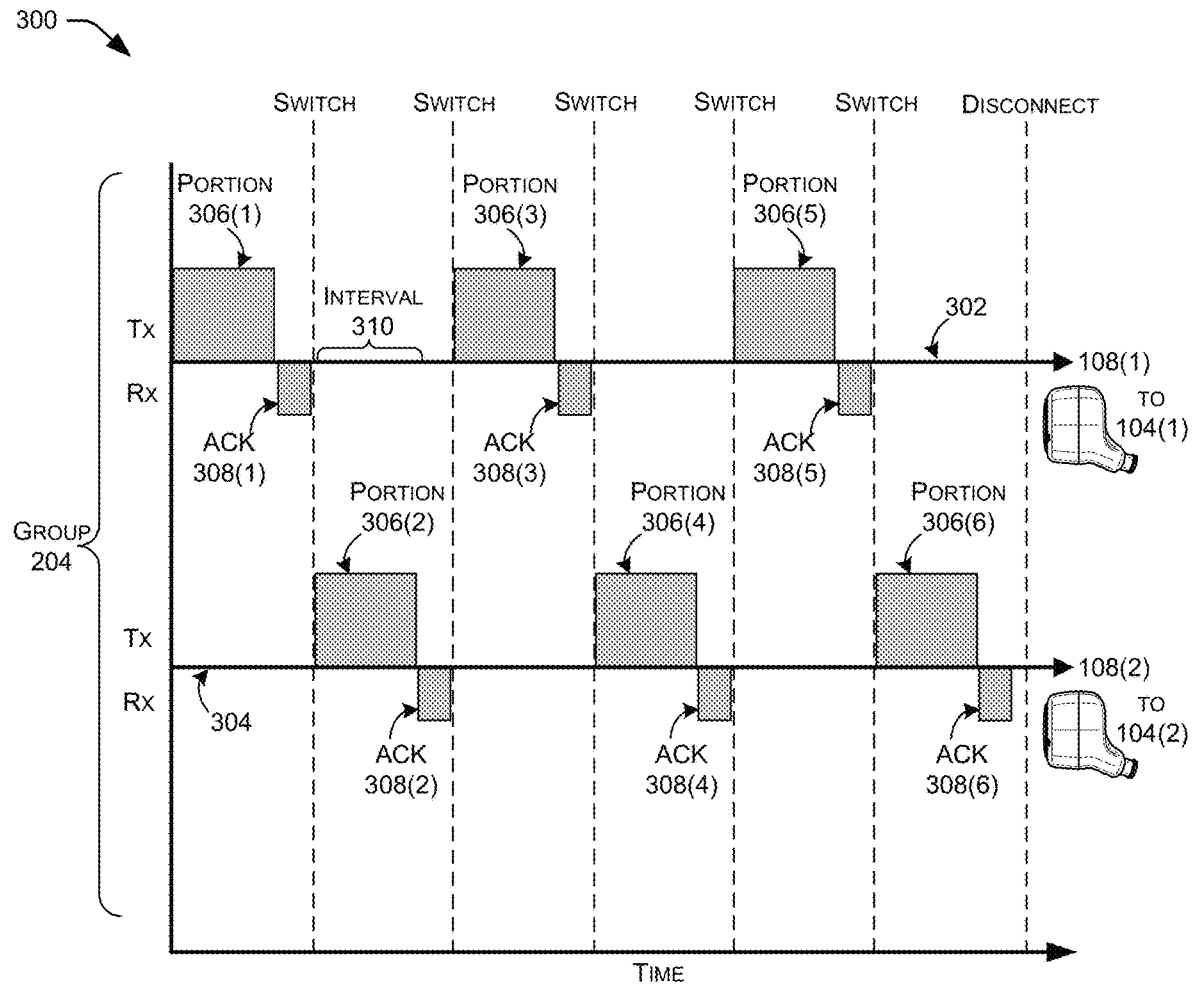
FIG. 3 illustrates a sequencing diagram for delivery of data portions from a central device to individual peripheral devices of a group. The data portions may be sent in an interwoven manner to multiple peripheral devices, rather than sending all portions to one peripheral device at a time. After each data portion, an acknowledgment message may be sent by the respective peripheral device and received by the central device, which may trigger the sending of the next data portion. After all portions for any given data set have been received, the peripheral device may be disconnected from the group.
Figure 4:
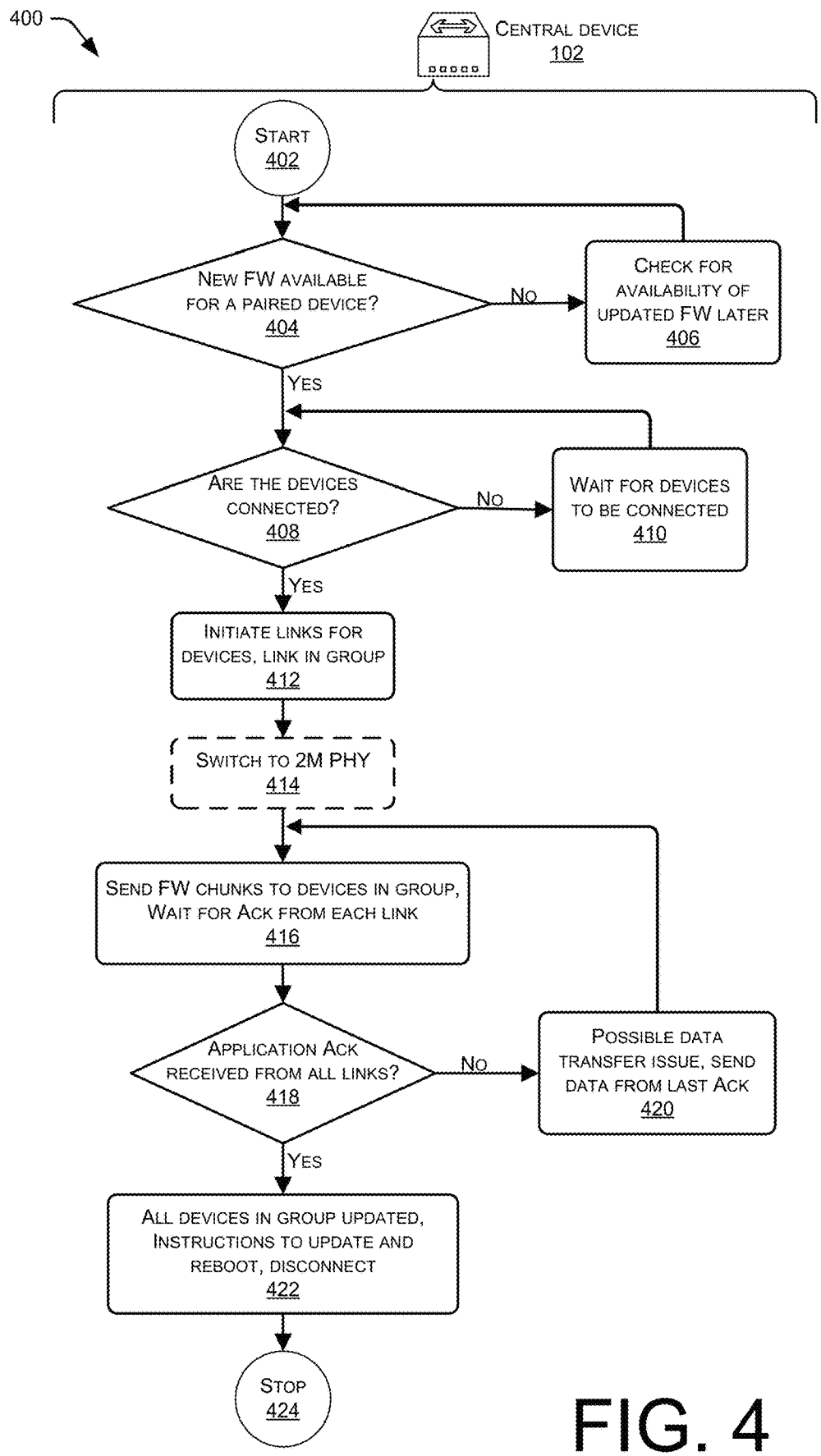
FIG. 4 illustrates a flow diagram of an example process in which a central device determines whether peripheral devices that need a firmware update are currently connected to the central device. In an instance where multiple peripheral devices are connected, happen to be a same make/model of device, and therefore need the same update, the central device can initiate isochronous data links with the peripheral devices, group the peripheral devices, and deliver the update. In some instances, the central device may also check whether the update was received, instruct the peripheral devices to install the update, and disconnect the data links.
Figure 5:
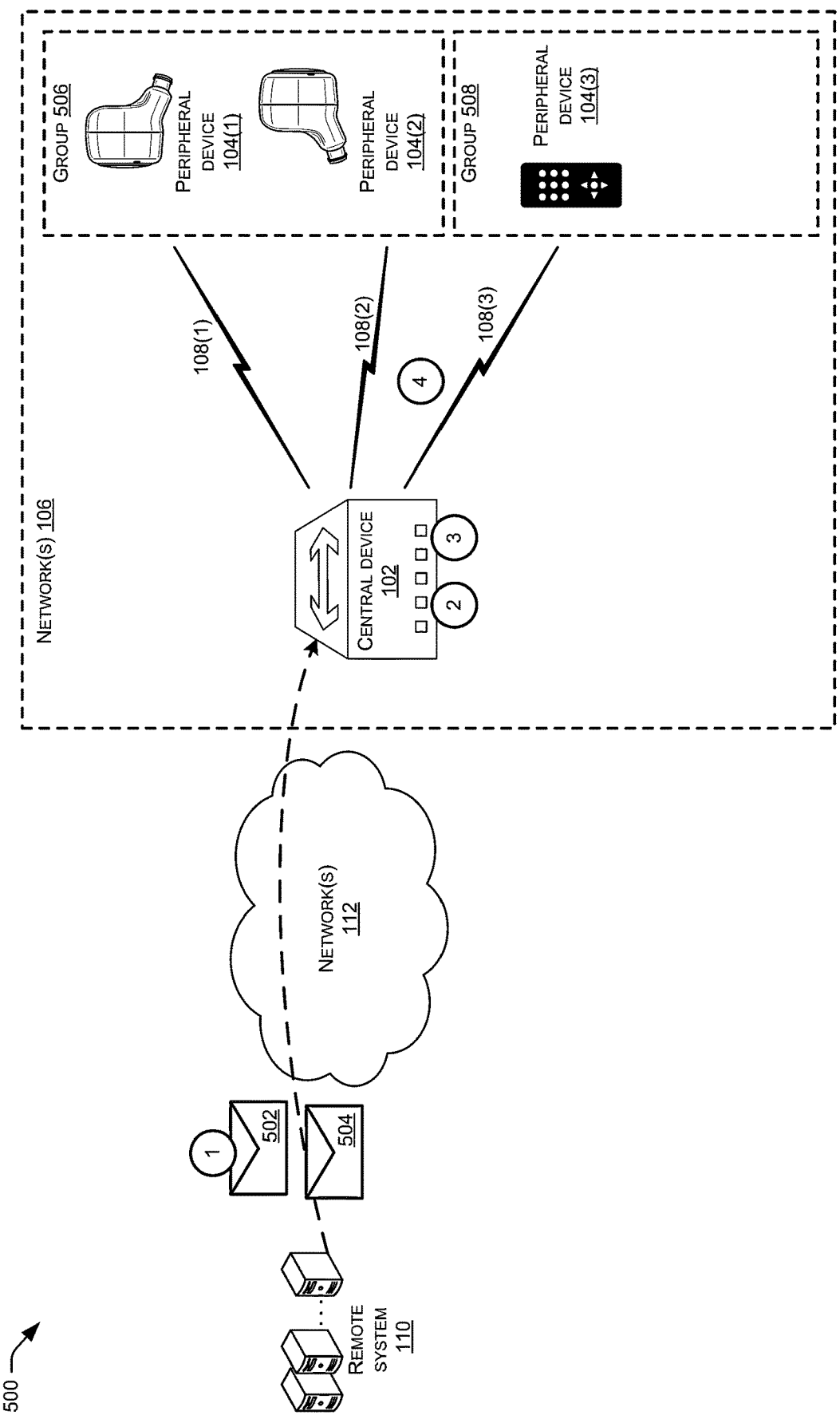
FIG. 5 illustrates a sequence of operations in which a central device receives data from a remote system, and forwards the data to multiple peripheral devices.
Figure 6:
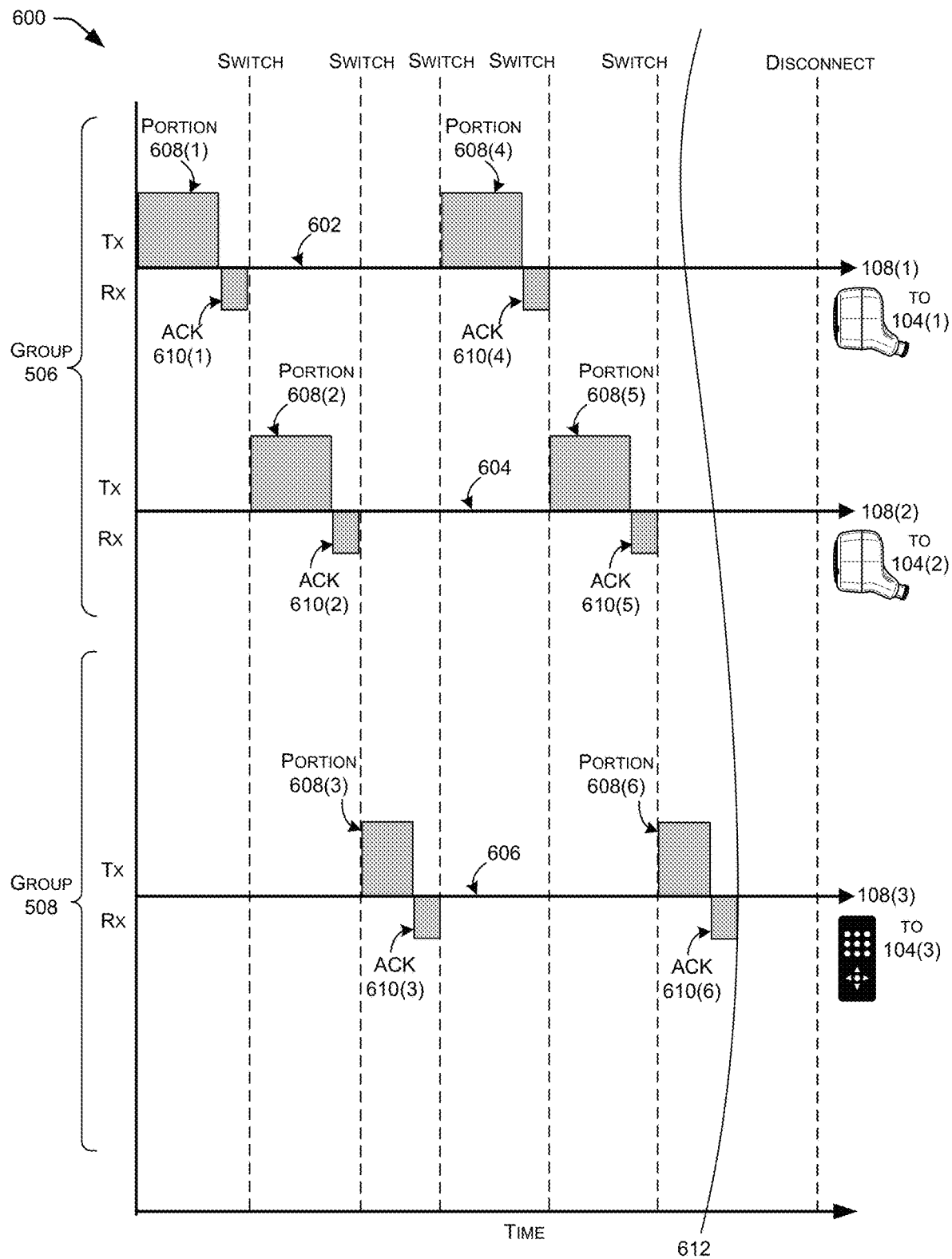
FIG. 6 illustrates a sequencing diagram for delivery of data portions from a central device to individual peripheral devices of two groups. The data portions may be sent in an interwoven manner to the multiple peripheral devices of both groups, rather than sending all portions to one peripheral device at a time. After each data portion, an acknowledgment message may be sent by the respective peripheral device and received by the central device, which may trigger the sending of the next data portion. After all portions for any given data set have been received, the peripheral device may be disconnected from the respective group.
Figure 7:
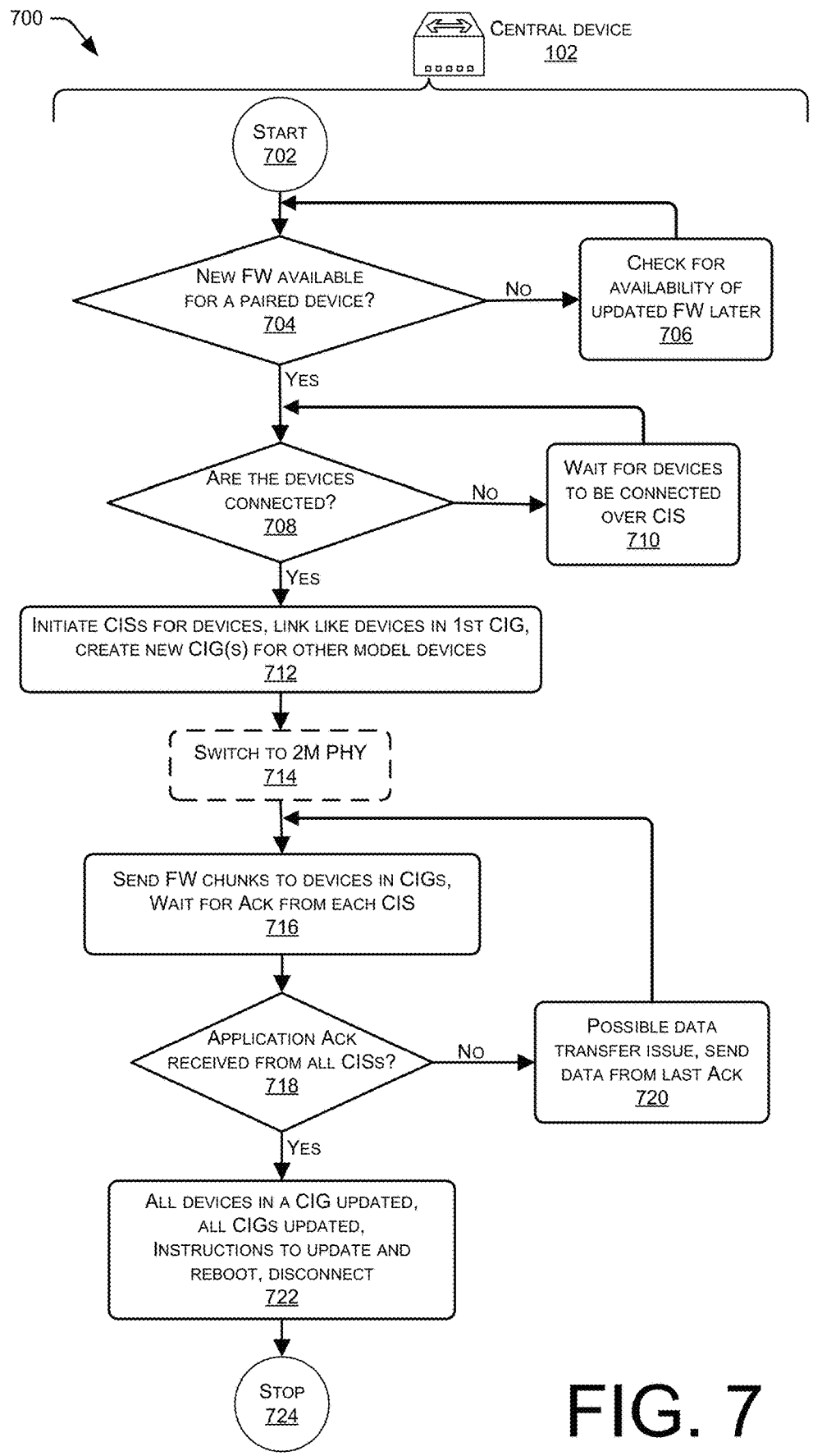
FIG. 7 illustrates a flow diagram of an example process in which a central device determines whether peripheral devices that need a firmware update are currently connected to the central device. In an instance where multiple peripheral devices are connected, happen to include more than one make/model of device, and therefore need different updates, the central device can initiate isochronous data links with the peripheral devices, group the peripheral devices into groups based on the make/model of device, for instance, and deliver the update(s). In some instances, the central device may also check whether the update(s) were received, instruct the peripheral devices to install the update(s), and disconnect the data links.

FIGS. 2-4 collectively illustrate an example scenario featuring isochronous data transfer with one group (e.g., connected isochronous group (CIG)). FIGS. 5-7 collectively illustrate an example scenario featuring isochronous data transfer with two groups (e.g., CIGs). Note that some aspects of the examples shown in FIG. 2-7 may be similar to aspects of the examples described in respective preceding FIGS., such as FIG. 1. Therefore, for sake of brevity, not all elements of FIGS. 2-7 will be described in detail.

Further, while the examples in FIGS. 2-7 are described with reference to a central device 102, peripheral devices 104, and firmware updates, it is to be appreciated that the isochronous data transfer techniques may be performed using any type of central, accessory, and/or other electronic device, and in a wide variety of use-case scenarios. For instance, while FIGS. 2-7 illustrate that the central device may pair to in-ear and/or remote devices, in other instances the techniques may be used for isochronous data transfer between any sort of electronic device to any other electronic device, such as laptop computers, smart speakers, animatronic figures, wall clocks, wearable devices, smart televisions, smart appliances (e.g. lights, household appliances, etc.), and/or the like. Further, it is to be appreciated that the techniques shown in the examples in FIGS. 2-7 may be used to isochronously transfer a variety of types of data, beyond a use-case scenario of a firmware update to peripheral devices.

FIG. 2 illustrates a sequence of operations 200 corresponding to an example scenario featuring isochronous data transfer with one group. In FIG. 2, remote system 110 may provide a firmware update for one or more peripheral devices, such as peripheral devices 104(1) and 104(2) that were introduced above, relative to the example in FIG. 1. The firmware update may be delivered in the form of configuration data 202 (e.g., update image) sent from remote system 110 to central device 102. Since the peripheral devices 104(1) and 104(2) are a same, or at least substantially similar, make and model (e.g., a pair of ear-based devices) in this example, the firmware update may be applicable to both peripheral devices 104(1) and 104(2). Therefore, both peripheral devices 104(1) and 104(2) may be grouped together in a common group 204. In some examples, central device 102 may deliver the configuration data 202 isochronously to the members of group 204.

FIG. 2 illustrates, at "1", the configuration data 202 being sent by the remote system 110 to the central device 102. As suggested above, the associated firmware update may be pushed by a cloud-based service, and/or the central device 102 may inquire as to the potential availability of an update for any peripheral devices 104 with which the central device 102 has paired. In some examples, the central device 102 may build and/or maintain a list of paired peripheral devices 104 that are due for updates. In some instances, the central device 102 may determine that a firmware update sent by a cloud-based service is not needed by any peripheral device 104 to which the central device 102 is paired. For instance, the peripheral devices 104 may have already received the update. In these instances, the central device 102 may simply discard the firmware update and/or configuration data.

At "2", central device 102 may determine a list of peripheral devices 104 that are due for a firmware update associated with configuration data 202. Central device 102 may determine that from the list, peripheral devices 104(1) and 104(2) are currently connected to the central device 102. This operation may also include determining that the configuration data 202 is appropriate for both peripheral devices 104(1) and 104(2). For instance, peripheral devices 104(1) and 104(2) may be a same make and/or model, such as a pair of ear-based devices. As such, the configuration data 202 may be particularly intended for the same make and model of the pair of ear-based devices. Further, peripheral devices 104(1) and 104(2) may not have received the configuration data 202 previously, and thus may be due for the firmware update. Note that in some examples, any given firmware update may not necessarily be appropriate for all peripheral or other electronic devices of a same make and/or model. For instance, a subset of the devices may have received a different previous update than another subset. In such an instance, the two different subsets may require different new updates to move forward. A variety of criteria are contemplated for determining a logical subset of peripheral devices 104 and/or data links 108 associated with an update.

Once the central device 102 has determined a subset of peripheral device 104 to target with the update, the central device 102 may form group 204. In some examples, forming group 204 may include such functions such as storing data indicating that the subset of the peripheral devices 104 are part of group 204, storing data indicating that data links 108(1) and 108(2) (e.g., CISs) are part of group 204, identifying that the configuration data 202 is intended for transfer to group 204, etc. Note that two data links 108 are depicted as part of group 204. In other examples, the number of data links 108 that may be included in any given group may be limited by a variety of factors, such as a chipset limit on a number of connections at the central device 102, a desired data rate, an airtime utilization of the pipeline, co-existence with other wireless technologies, etc. The number of data links 108 or data streams included in a group may be much higher, such as 31, in some cases.

At "3", central device 102 may perform a variety of functions associated with dividing the configuration data 202 into portions of data and/or other aspects of preparing the configuration data 202 for delivery to the peripheral devices. Preparation of the configuration data 202 for delivery will be described in more detail relative to FIGS. 3 and 4, for example.

At "4", central device 102 may send the configuration data 202 to the peripheral devices 104 that are included in group 204, via the data links 108. This operation will also be described in more detail relative to FIGS. 3 and 4, below.

FIG. 3 illustrates an example sequencing diagram 300 for delivery of configuration data 202 from central device 102 to individual peripheral devices 104 of group 204. At line 302, sequencing diagram 300 illustrates data transfer along data link 108(1) (e.g., CIS) to peripheral device 104(1). At line 304, sequencing diagram 300 illustrates data transfer along data link 108(2) to peripheral device 104(2). Lines 302 and 304 may be viewed as timelines illustrating the transmission (Tx) of portions 306 of data that correspond to configuration data 202 to the respective peripheral devices 104 from the central device 102. Lines 302 and 304 also illustrate the receipt (Rx) of acknowledgments 308 (e.g., acknowledgment data, ACKs) by the central device 102, the acknowledgments 308 having been sent from the peripheral devices 104 in response to each portion 306 of data the peripheral devices 104 receive.

In some examples, CIS 108(1) and CIS 108(2) may be viewed as a common pipeline available for data transfer to group 204. As such, at any particular moment in time, data may be transferred or received to or from only one peripheral device 104. For example, in sequencing diagram 300, the x-axis represents time, with time proceeding from left to right across the drawing page. Therefore, sequencing diagram 300 indicates that first, portion 306(1) of configuration data 202 is transmitted to peripheral device 104(1). Next, ACK 308(1) is received by central device 102. Next, the data pipeline is used to transmit portion 306(2) of configuration data 202 to peripheral device 104(2), and so forth. The "switch" from the use (transmission and/or receipt) of data link 108(1) to data link 108(2) is depicted with a vertical dashed line. The dashed line is simply intended to aid the reader in distinguishing time slots of sequencing diagram 300. Note that although only two data links 108 are represented in this scenario, any given group may include a different number of data links 108.

The switching of the use of data links 108 may be referred to as alternating the transfer of data between peripheral devices 104. As used herein, alternating may include any even pattern of switching between any number of peripheral devices 104 in one or more groups, such as round robin. For instance, FIG. 3 depicts an even pattern or frequency of switching data transfer between peripheral devices 104(1) and 104(2), alternating evenly between the two devices. However, alternating may also include any uneven, intermittent, or changing pattern or frequency of switching data transfer between peripheral devices 104. For instance, in some scenarios, central device 102 may determine that a particular peripheral device 104 has a higher priority for update than two other peripheral devices 104. The peripheral devices in this scenario may be receiving the same firmware update, but the central device 102 may try to send the firmware update more quickly to the higher priority peripheral device than to the other, lower priority peripheral devices. Therefore, the central device 102 may devise an alternating transmission pattern that includes sending a first portion of data to the higher priority peripheral device, then sending the first portion to at least one of the lower priority peripheral devices. The alternating transmission pattern may then include switching back to send a second portion of the firmware update to the higher priority peripheral device before sending the first portion of the data to another of the lower priority peripheral devices. In this manner, the higher priority peripheral device is likely to receive the complete firmware update before any of the lower priority peripheral devices since the higher priority peripheral device is receiving individual portions at a higher frequency. In another example, a particular peripheral device may not be ready to receive a portion of data when its turn comes around. In this example, the central device 102 may need to pass over the particular peripheral device and move on to transmitting data to another device, until the particular peripheral device is ready to receive its next portion. Any scheme of alternating transfer of data between any number of peripheral devices 104 in one or more groups may be consistent with isochronous data transfer techniques.

Virtually any scheme of alternating transfer of data may also be more efficient for transferring data to multiple peripheral devices 104 overall, in contrast to transferring an entire data set to one peripheral device before switching to the next peripheral device. One reason for the improved efficiency of isochronous data transfer techniques corresponds to the connection intervals (e.g., slots) for data transfer inherent to some wireless protocols. For transfer of any given packet of data, central device 102 may need to match up, or otherwise coordinate, a connection interval of the data link 108. For instance, referring again to FIG. 3, transmission of portion 306(1) may correspond to a particular connection interval. Similarly, receipt of ACK 308(1) may correspond to another connection interval, which may or may not be adjacent and/or subsequent to the particular connection interval associated with portion 306(1). Further, after receipt of ACK 308(1), central device 102 may be required to wait through an interval 310 (e.g., a remaining portion of an interval, an empty slot prescribed by the governing protocol, etc.) until it is able to use data link 108(1) to send another portion 306 of data to peripheral device 104(1). In this instance, instead of waiting idly through interval 310, it may be more efficient for central device 102 to use the available data pipeline to transfer portion 306(2) to peripheral device 104(2). Consider the accumulation of unused data transfer time that could occur through the central device 102 remaining idle during numerous cycles of portion transmission and ACK receipt, for multiple peripheral devices. For this reason, any scheme of alternating transfer of data, and avoiding idle time where possible, may be more efficient overall for transferring data to multiple peripheral devices 104. Note that the graphical representation of transmission times, reception times, and/or other intervals in FIG. 3, including interval 310, is for illustration purposes, and is not necessarily to scale.

In some examples, the data portions 306 may be sent from central device 102 to each of the peripheral devices 104 in sequence. For instance, portions 306(1) and 306(2) may represent a same portion of configuration data 202, and portions 306(3) and 306(4) may represent a subsequent portion of configuration data 202, with a successive sequence number. In other examples the portions may not necessarily be sent in numbered sequence.

FIG. 4 illustrates a flow diagram of an example process 400 for delivery of configuration data 202 from central device 102 to individual peripheral devices 104 of group 204. The process 400 starts at 402. In some examples, the process 400 is performed by central device 102. The process 400, as well as each process and/or operation described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while some of the operations are described as being performed by certain devices or components in these examples (e.g., central device 102), it is to be appreciated that other devices and components may perform some or all of these operations in other instances.

An operation 404 represents determining whether a new firmware (FW) update is available for a paired peripheral device 104. If not, an operation 406 may include checking for the availability of a firmware update and/or configuration data at a later time, returning the process 400 to the start at 402. Upon determining that a new firmware update is available, the process 400 may proceed to an operation 408.

Operation 408 represents determining whether any peripheral devices 104 are currently connected to the central device 102, such that they might be available to establish a data link and receive an update. If not, an operation 410 may include waiting for peripheral devices 104 to be connected such that a data link may be established, returning the process 400 to the operation 408. Upon determining that at least one peripheral device 104 is connected, the process 400 may proceed to an operation 412.

Operation 412 may include initiating data links for peripheral devices 104 that are targeted for the firmware update and that were determined to be currently connected to the central device 102. Operation 412 may also include linking or otherwise grouping the data link into a group (e.g., group 204).

In some examples, the central device 102 may perform additional functions to try to further optimize the data transfer to the peripheral devices 104. For instance, an operation 414 may include switching the data links in group 204 to a relatively improved or newer protocol for faster delivery of the portions of the firmware update, for supporting a larger number of data links, or for other reasons. One such newer protocol includes BLE 2 Mbps PHY. The dashed-line box for operation 414 in FIG. 4 is meant to suggest that such optimization functions are optional. Other functions or techniques for further optimizing data transfer are considered.

An operation 416 may include sending firmware portions (e.g., chunks) to peripheral devices 104 in group 204. As discussed above relative to FIG. 3, the sending of the portions may follow on alternating pattern between different peripheral devices. Operation 416 may also include waiting for an acknowledgment on each data link from the respective peripheral device 104 before proceeding to send a subsequent portion of the data.

An operation 418 represents determining whether an application acknowledgment has been received from each of the data links. An application acknowledgment may be different than the acknowledgments received following transmission of each portion of the firmware update. For example, the application acknowledgment may represent application-level acknowledgment data that indicate the complete firmware update has been received by the respective peripheral device 104. Stated another way, the application acknowledgment may convey that a peripheral device has received each portion of data of the firmware update so that the complete firmware update may be reconstructed, and/or that the peripheral device may be able to use the firmware update to update. In contrast the ACKs 308 shown in FIG. 3 may represent link-layer, or data-layer, acknowledgment data that indicate receipt of a particular piece of data. For instance, an ACK 308 may include a check sum for a particular portion 306 and/or sequence number of data. In some examples, an application layer of the central device 102 may be responsible for various aspects of process 400. For instance, the application layer may create data links, confirm that the peripheral devices are connected with the data links, divide a firmware update into portions, and place the firmware portions into outgoing buffer.

Referring again to FIG. 4, at operation 418, if an application acknowledgment has not been received from each data link, an operation 420 may represent returning to operation 416 to send data that should have been transmitted following the last received data-layer acknowledgment (e.g., ACK 308). For instance, a data transfer issue may have occurred, and at least some portion of the data may need to be resent to the respective peripheral device 104. Otherwise, if an application acknowledgment has been received from all data links, process 400 may proceed to an operation 422.

Operation 422 may include functions such as recognizing that all peripheral devices 104 in group 204 have been updated or have at least received a complete firmware update, sending instructions to the peripheral devices 104 to update based on the firmware update and/or to reboot, and terminating the data links 108 or otherwise disconnecting the data links. The process may then stop at 424.

FIGS. 5-7 collectively illustrate an example scenario featuring isochronous data transfer with two groups. Note that some aspects of the examples shown in FIG. 5-7 may be similar to aspects of the examples described in FIGS. 2-4. Therefore, for sake of brevity, not all elements of FIGS. 5-7 will be described in detail.

FIG. 5 illustrates a sequence of operations 500 corresponding to an example scenario featuring isochronous data transfer with two groups. In FIG. 5, remote system 110 may provide configuration data 502 and 504 for updating one or more peripheral devices 104. Configuration data 502 may be intended for peripheral devices 104(1) and 104(2), while configuration data 504 may be intended for peripheral device 104(3). In this example scenario, peripheral device 104(3) may be a remote control device. In this instance the different types of peripheral devices 104 require different firmware updates. Therefore, peripheral devices 104(1) and 104(2) may be grouped together in a first group 506, while peripheral device 104(3) is placed in a second group 508. Note that the term "group" does not necessarily indicate that more than one peripheral device is included. In some examples, central device 102 may deliver the configuration data 502 and 504 isochronously to groups 506 and 508.

FIG. 5 illustrates, at "1", the configuration data 502 and 504 being sent by the remote system 110 to the central device 102. As suggested above, the associated firmware update may be pushed by a cloud-based service, and/or the central device 102 may inquire as to the potential availability of an update for any peripheral devices 104 with which the central device 102 has paired.

At "2", central device 102 may determine a list of peripheral devices 104 that are due for a firmware update associated with configuration data 502 and/or configuration data 504. Central device 102 may determine that from the list, peripheral devices 104(1) and 104(2) are currently connected to the central device 102 and due for the firmware update related to configuration data 502. Central device 102 may also determine that from the list, peripheral devices 104(4) and 104(5) are currently connected to the central device 102 and due for the firmware update related to configuration data 504. The central device may then form groups 506 and 508. In some examples, several peripheral devices 104 may be a same make and model device, but may be due for different versions of firmware updates for various reasons. Therefore, a central device 102 may logically group peripheral devices 104 of a same make and model in different groups.

At "3", central device 102 may prepare configuration data 502 and/or 504 for delivery to the peripheral devices 104. At "4", central device 102 may send the configuration data 502 and/or 504 to the peripheral devices 104, via the data links 108. In some cases, preparation of the configuration data may include determining a portion size for configuration data 502 and/or 504, determining a pattern of data delivery to the peripheral devices 104 and/or groups 506 and 508, etc. More discussion regarding this preparation will be provided relative to FIG. 9, below.

FIG. 6 illustrates an example sequencing diagram 600 for delivery of configuration data 502 from central device 102 to individual peripheral devices 104 of group 506, and for delivery of configuration data 504 from central device 102 to individual peripheral devices 104 of group 508. At line 602, sequencing diagram 600 illustrates data transfer along data link 108(1) to peripheral device 104(1). At line 604, sequencing diagram 600 illustrates data transfer along data link 108(2) to peripheral device 104(2). At line 606, sequencing diagram 600 illustrates data transfer along data link 108(4) to peripheral device 104(4). Lines 602, 604, and 606 may be viewed as timelines illustrating the transmission (Tx) of portions 608 of data that correspond to configuration data 502 and 504 to the respective peripheral devices 104 from the central device 102. Lines 602, 604, and 606 also illustrate the receipt (Rx) of acknowledgments 610 (e.g., acknowledgment data, ACKs) by the central device 102, the acknowledgments 610 having been sent from the peripheral devices 104 in response to each portion 608 of data the peripheral devices 104 receive. Note that the data portions 608(3) and 608(6) are depicted in FIG. 6 as narrower than the data portions associated with group 506. Discussion of factors influencing a portion size generated by central device 102 for a particular group will be discussed relative to FIG. 9, below. Also note that FIG. 6 includes a line 612 indicating that the timeline may jump forward to the "disconnect" occurrence. Line 612 is intended to convey that additional and/or subsequent portions 608 of configuration data may be sent to the peripheral devices 104 before a complete update (e.g., all of the relevant portion of the configuration data needed to complete an update) is delivered to any particular peripheral device. For instance, note that since the portions of data sent to peripheral device 104(3) are relatively smaller, more portions overall may need to be sent to peripheral device 104(3) to constitute complete configuration data 504 (assuming a same or similar overall size as configuration data 502).

In some examples, the data links of group 506 and group 508 may be viewed as a common pipeline available for data transfer to the peripheral devices 104. As such, at any particular moment in time, data may be transferred or received to or from only one peripheral device 104. In accordance, the "switch" from the use (transmission and/or receipt) of data link 108(1) to data link 108(2), and then to data link 108(3), is depicted with a vertical dashed line. The dashed line is simply intended to aid the reader in distinguishing time slots of sequencing diagram 600.

The transfer of data between peripheral devices 104 of group 506 and/or group 508 may be performed with an alternating pattern, such as the a round robin pattern depicted in FIG. 6, or may be performed with a wide variety of other alternating patterns. The pattern depicted in the example scenario in FIG. 6 is not meant to be limiting. The alternating and/or switching of data transfer between data links may follow any sort of even, uneven, and/or changing pattern, consistent with isochronous data transfer techniques. As described above relative to FIG. 3, any scheme of alternating transfer of data, potentially helping avoiding idle time where possible, may be more efficient overall for transferring data to multiple peripheral devices 104. Further, in some examples, the data portions 608 may be sent from central device 102 to each of the peripheral devices 104 in sequence. For instance, portions 608(1) and 608(2) may represent a same portion of configuration data 502, and portions 608(4) and 608(5) may represent a subsequent portion of configuration data 502, with a successive sequence number. In other examples the portions may not necessarily be sent in numbered sequence.

FIG. 7 illustrates a flow diagram of an example process 700 for delivery of configuration data 502 and 504 from central device 102 to individual peripheral devices 104 of group 506 and group 508. The process 700 starts at 702. In some examples, the process 700 is performed by central device 102.

An operation 704 represents determining whether one or more new firmware updates are available for any peripheral devices 104. If not, an operation 706 may include checking for the availability of a firmware update and/or configuration data at a later time, returning the process 700 to the start at 702. Upon determining that a new firmware update is available, the process 700 may proceed to an operation 708.

Operation 708 represents determining whether any peripheral devices 104 are currently connected to the central device 102, such that they might be available to establish a data link and receive an update. If not, an operation 710 may include waiting for peripheral devices 104 to be connected such that a data link may be established, returning the process 700 to the operation 708. Upon determining that at least one peripheral device 104 is connected, the process 700 may proceed to an operation 712.

Operation 712 may include initiating data links for peripheral devices 104 that are targeted for the firmware update(s) and that were determined to be currently connected to the central device 102. Operation 712 may also include linking or otherwise grouping the data links into one or more groups, such as group 506 and group 508. An optional (dashed line) operation 714 may include potentially optimizing functions, such as switching the data links in group 506 and/or group 508 to BLE 2 Mbps PHY for potentially faster delivery of the portions of the configuration data, or other functions or techniques for further improving data transfer.

An operation 716 may include sending firmware portions (e.g., chunks) to peripheral devices 104 in group 506 and/or 508. As discussed above relative to FIG. 6, the sending of the portions may follow on alternating pattern between different peripheral devices and/or between different groups. Operation 716 may also include waiting for an acknowledgment on each data link from the respective peripheral device 104 before proceeding to send a subsequent portion of the data to any other peripheral device 104.

An operation 718 represents determining whether an application acknowledgment has been received from each of the data links. For example, the application acknowledgment may represent application-level acknowledgment data that indicate the complete firmware update has been received by the respective peripheral device 104. If an application acknowledgment has not been received from each data link, an operation 720 may represent returning to operation 716 to send data that should have been transmitted following the last received data-layer acknowledgment (e.g., ACK 612). For instance, a data transfer issue may have occurred, and at least some portion of the data may need to be resent to the respective peripheral device 104. Otherwise, if an application acknowledgment has been received from all data links, process 700 may proceed to an operation 722.

Operation 722 may include functions such as recognizing that all peripheral devices 104 in group 506 and/or group 508 have been updated or have at least received a complete firmware update, recognizing that all groups have been updated, sending instructions to the peripheral devices 104 to update based on the firmware update and/or to reboot, and terminating the data links 108 or otherwise disconnecting the data links. The process may then stop at 724.

Figure 8A:
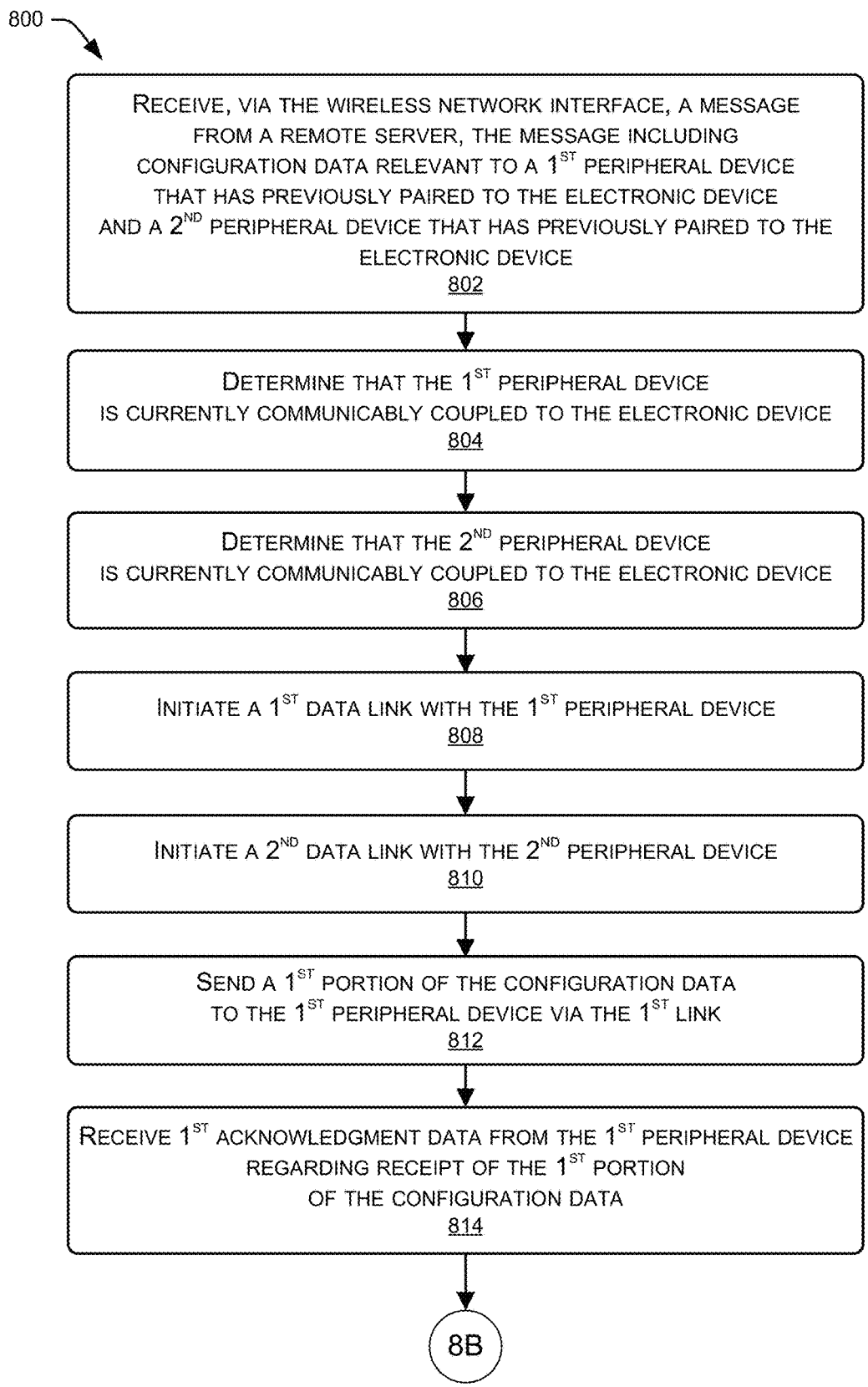
FIGS. 8A-B collectively illustrate a flow diagram of an example process for isochronous data transfer from a central device to peripheral devices, consistent with the present concepts.
Figure 8B:
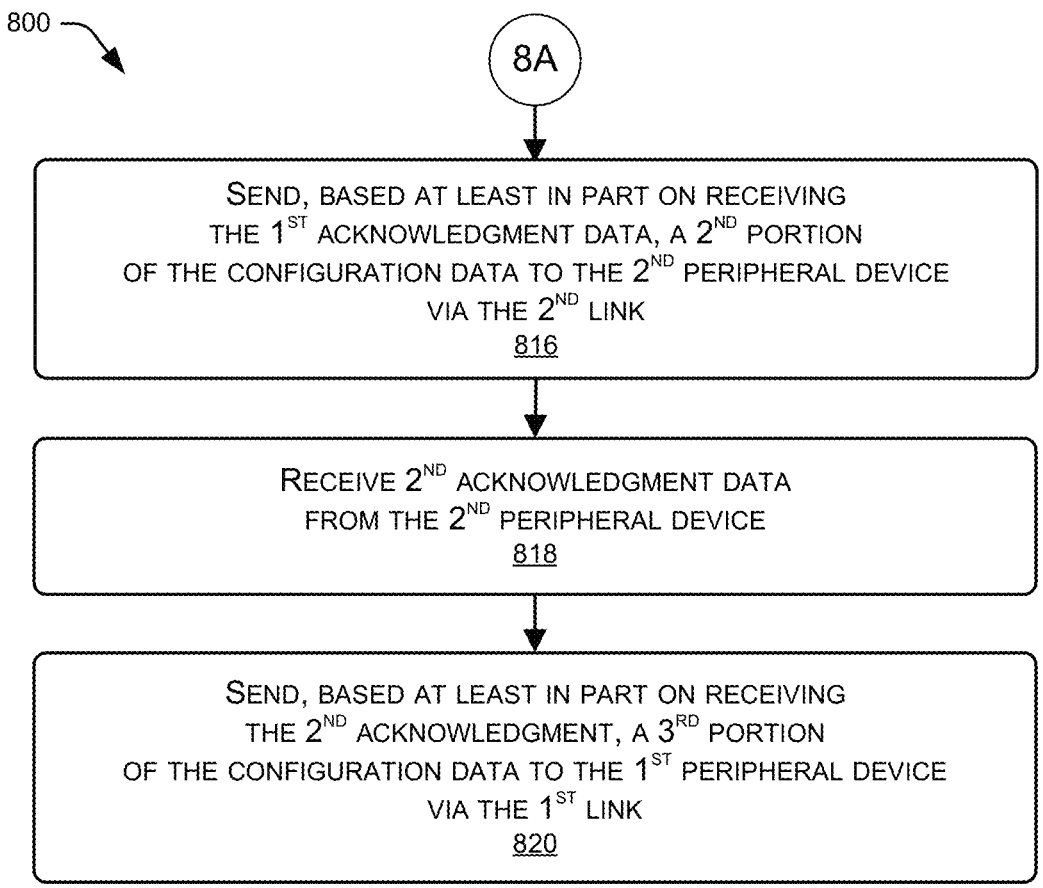

FIGS. 8A-B collectively illustrate a flow diagram of an example process 800 for isochronous data transfer techniques. For example, in process 800, an electronic device (e.g., central device 102) may send one or more configuration data sets (e.g., configuration data 202, 502, 504) to peripheral devices (e.g., peripheral devices 104) using isochronous data transfer techniques.

An operation 802 represents receiving, via the wireless network interface, message data from a remote server. In some examples, the message data may include configuration data relevant to at least a first peripheral device that has previously paired to the electronic device and a second peripheral device that has previously paired to the electronic device. In some examples, the configuration data may comprise at least one firmware update for at least one of the first peripheral device or the second peripheral device.

An operation 804 represents determining that the first peripheral device is currently connected to the electronic device. Similarly, an operation 806 represents determining that the second peripheral device is currently connected to the electronic device.

An operation 808 represents initiating a first data link with the first peripheral device. Similarly, an operation 810 represents initiating a second data link with the second peripheral device. Process 800 may include storing data indicating that the first peripheral device and the second peripheral device, or the first data link and the second data link, are both part of a group (e.g., connected isochronous group (CIG)). The first data link and the second data link may also be recognized as part of and/or accessing a common data pipeline for data transfer from the electronic device.

An operation 812 represents sending a first portion of the configuration data to the first peripheral device via the first link. For instance, a first data portion of a first configuration data set may be sent to the first peripheral device.

An operation 814 represents receiving first acknowledgment data from the first peripheral device regarding receipt of the first portion of the configuration data.

FIG. 8B continues the illustration of the process 800 and includes, at an operation 816 sending, based at least in part on receiving the first acknowledgment data, a second portion of the configuration data to the second peripheral device via the second link. In some examples, sending the second portion to the second peripheral device may comprise sending the same first data portion of the first update image that was previously sent to the first peripheral device. Stated another way, an initial portion of configuration data that the first and second peripheral devices each receive may actually be the same portion of data from the same update. In other examples, the second peripheral device may receive a portion of a different update, while the overall scheme is still consistent with isochronous data transfer techniques, including interleaving the transmission of data to different devices in an alternating pattern.

An operation 818 represents receiving second acknowledgment data from the second peripheral device. An operation 820 represents sending, based at least in part on receiving the second acknowledgment, a third portion of the configuration data to the first peripheral device via the first link. In some examples, the third portion may comprise a second data portion of the first update mentioned above. In some examples, generating the first portion, the second portion, the third portion, and/or any other portions of the configuration data may be based at least in part on a size of the at least one firmware update. Additionally or alternatively, division of the configuration data into portions may be based on a variety of other factors, many of which are described above and below.

In some examples, after each portion of a relevant update has been sent to any given peripheral device, the peripheral device may have a complete update. For instance, the peripheral device may be able to reconstruct a complete update from the portions of configuration data received. Process 800 may include receiving a final acknowledgment data from the first peripheral device, the final acknowledgment data indicating that a complete update has been received by the first peripheral device. The final acknowledgment data may correspond to an application level acknowledgment message, in some instances. Based at least in part on receiving the final acknowledgment data, process 800 may include sending an instruction to the first peripheral device to update using the complete update. Process 800 may further include terminating the first data link and/or the second data link, or otherwise disconnecting from the peripheral devices.

Figure 9A:
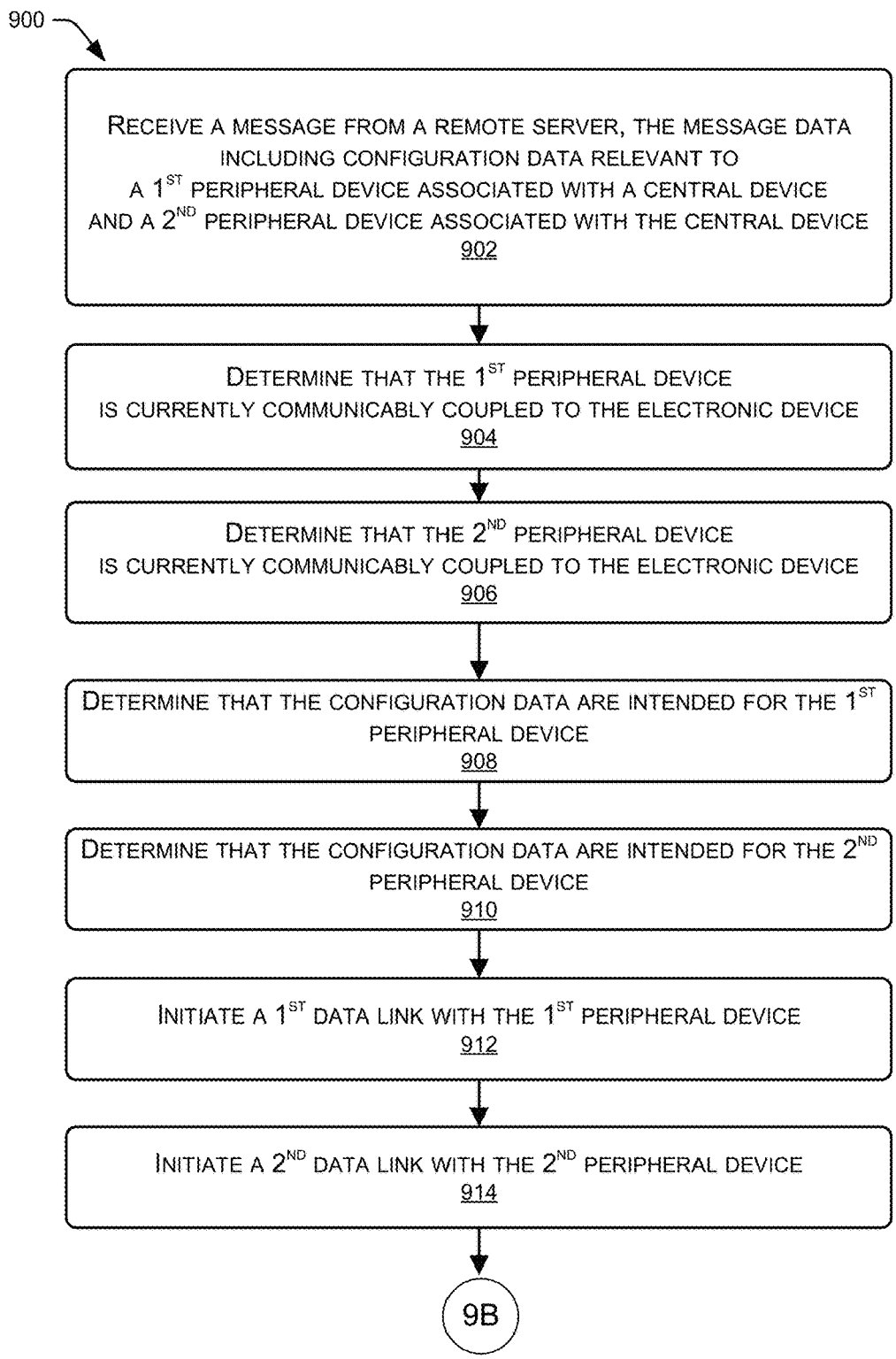
FIGS. 9A-B collectively illustrate another flow diagram of an example process for isochronous data transfer from a central device to peripheral devices, consistent with the present concepts.
Figure 9B:
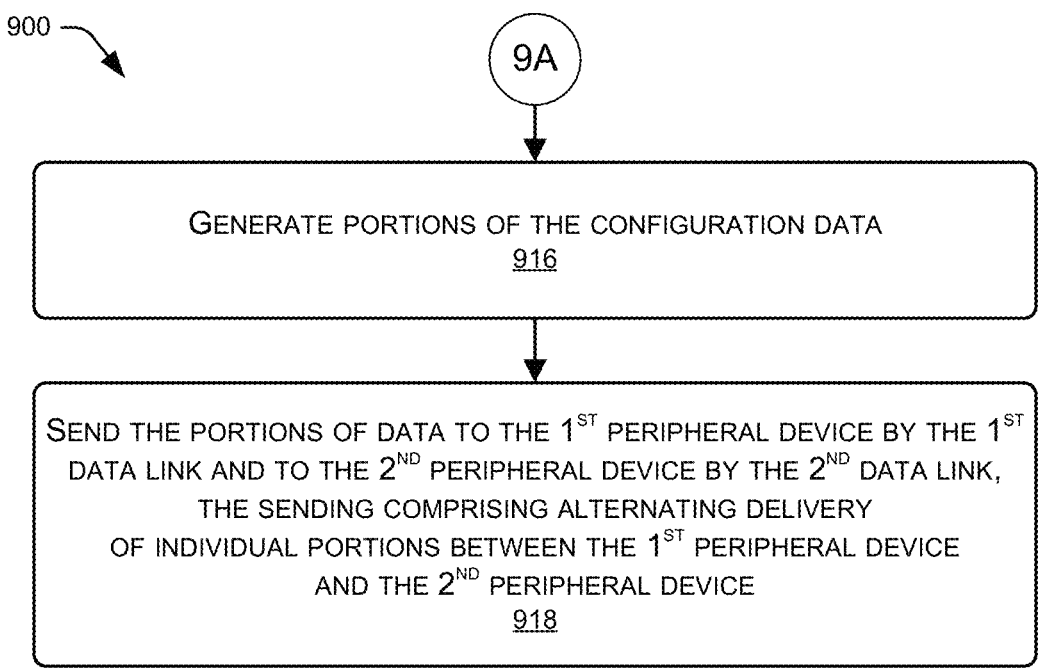

FIGS. 9A-B collectively illustrate a flow diagram of an example process 900 for isochronous data transfer techniques. For example, in process 900, an update (e.g., configuration data 202, 502, 504) may be sent to peripheral devices (e.g., peripheral devices 104) that are part of or associated with a group (e.g., connected isochronous group (CIG)). In some cases, process 900 may be performed by a central device, such as central device 102. In some examples, the central device may comprises a home automation hub, a smart phone, a tablet device, or another electronic device capable of isochronously transferring data to multiple peripheral devices.

An operation 902 represents receiving a message from a remote server. In some examples, the message may include configuration data relevant to at least a first peripheral device associated with a central device and a second peripheral device associated with the central device.

An operation 904 represents determining that the first peripheral device is currently communicably coupled to the central device. An operation 906 represents determining that the second peripheral device is currently communicably coupled to the central device.

An operation 908 represents determining that the configuration data are intended for the first peripheral device. An operation 910 represents determining that the configuration data are intended for the second peripheral device. In some examples, process 900 may include determining that the configuration data are also intended for a third peripheral device. However, process 900 may further include receiving, from the remote server, priority information regarding which peripheral devices should receive the update, and/or in which preferred order the devices should receive the configuration data. Based at least in part on the priority information, process 900 may include determining that the third peripheral device is a relatively lower priority than the first peripheral device and that the third peripheral device is a lower priority than the second peripheral device. Based at least in part on the third peripheral device being a lower priority than the first or second peripheral devices, process may include delaying delivery of the configuration data to the third peripheral device. For instance, delivery of the configuration data to the third peripheral device may be delayed until the first peripheral device and the second peripheral device have been updated, or at least until the configuration data have been sent to, or attempted to be sent to the first and second peripheral devices.

An operation 912 represents initiating a first data link with the first peripheral device. An operation 914 represents initiating a second data link with the second peripheral device. In some examples, process 900 may include storing data indicating that the first peripheral device and the second peripheral device are both part of a connected isochronous group FIG. 9B continues the illustration of the process 900 and includes, at an operation 916, generating portions of data representing the update and/or configuration data. Process 900 may further include determining a portion size based at least in part on a total number of peripheral devices receiving the configuration data from the central device. In some examples, the portions of the configuration data may be generated based at least in part on the portion size. Process 900 may also include receiving, from the remote server, update speed information regarding a desired update speed for the first peripheral device, the second peripheral device, and/or other peripheral devices. Therefore in some instances process 900 may include determining a portion size based at least in part on the update speed information, and the portions of the configuration data may be generated based at least in part on the portion size, in these instances.

In some examples, a portion size of the configuration data may be determined based on one or more of a variety of factors, including priority for a peripheral device to be updated, total size of a configuration data set that relates to a firmware update, expected latency in the network, total available bandwidth, etc. In one example, a pair of ear-based devices may require a first update, while a remote control requires a second update. The ear-based devices may be assigned a higher priority for updating due to the desire for the user to be able to quickly connect to an associated smartphone with the most current features and capabilities. Therefore, the central device may increase the portion size of data for the first update intended for the ear-based devices (or take other steps reflecting the priority). However, increasing the portion size of data for the first update leaves less available bandwidth (e.g., airtime) for the second update for any given time period. In response, the central device may decrease a portion size of data for the second update. The decrease may be acceptable since the remote control may be less dependent on having the most up-to-date software in order to function sufficiently. In general, generating a portion size of data related to any particular update, determining a pattern of alternating delivery between peripheral devices and/or groups, and/or determining a number of data links to include in any group, may require balancing any of a wide variety of factors or combination thereof, including but not limited to: priorities for updating any particular peripheral device; available bandwidth; overall number of peripheral devices that require updates; expected latency in the network (as related to effective available bandwidth); a desired speed, rate, and/or timeframe at or in which a peripheral device is intended to be updated (update speed information); airtime utilization percentage afforded to the central device; data rate per data link; co-existence/sharing with other wireless technologies in the physical area; a chipset limit of the central device on a number of possible connections to peripheral devices; etc.

An operation 918 represents sending the portions of data to the first peripheral device by the first data link and to the second peripheral device by the second data link. In some examples, the sending the portions may comprise alternating the delivery of individual portions between the first peripheral device and the second peripheral device. In some examples, alternating the delivery of the individual portions may comprise, in part, sending a first individual portion to the first peripheral device, then sending the first individual portion to the second peripheral device before sending a second individual portion to the first peripheral device. Process 900 may also include receiving first acknowledgment data indicating receipt of the first individual portion of the configuration data from the first peripheral device before sending the first individual portion of the configuration data to the second peripheral device. Further, process 900 may include receiving second acknowledgment data indicating receipt of the first individual portion of the configuration data from the second peripheral device before sending a second individual portion of the configuration data to the first peripheral device. Based at least in part on receiving the second acknowledgment data, process 900 may include clearing a buffer of the central device, wherein the sending the second individual portion of the configuration data to the first peripheral device is based at least in part on the buffer of the central device having been cleared.

Process 900 may further include receiving acknowledgment data from the first peripheral device indicating that each of the portions of the configuration data representing the update have been received. Based at least in part on the acknowledgment data, process 900 may also include sending an instruction to the first peripheral device to update using the configuration data.

Figure 10:
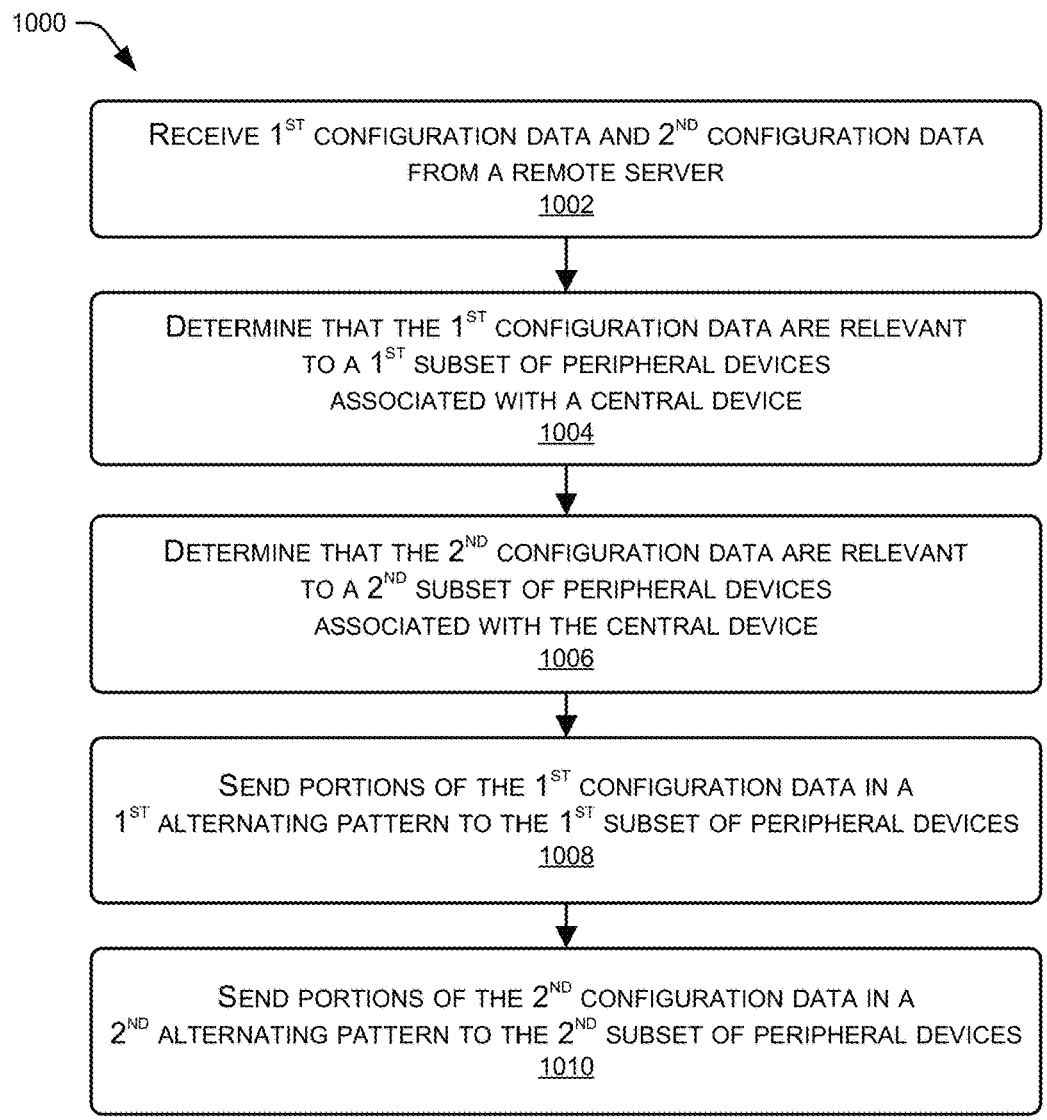
FIG. 10 illustrates a flow diagram of yet another example process for isochronous data transfer from a central device to peripheral devices, consistent with the present concepts.

FIG. 10 illustrates a flow diagram of an example process 1000 for isochronous data transfer techniques. For example, in process 1000, configuration data (e.g., configuration data 202, 502, 504) may be sent to peripheral devices (e.g., peripheral devices 104) corresponding to at least two groups.

An operation 1002 represents receiving first configuration data and second configuration data from a remote server. An operation 1004 represents determining that the first configuration data are relevant to a first subset of peripheral devices associated with a central device. An operation 1006 represents determining that the second configuration data are relevant to a second subset of the peripheral devices. In some examples, process 1000 may include storing first data indicating that the first subset of the peripheral devices are part of a first connected isochronous group. Process 1000 may also include storing second data indicating that the second subset of the peripheral devices are part of a second connected isochronous group.

An operation 1008 represents sending portions of the first configuration data in a first alternating pattern to the first subset of peripheral device. An operation 1014 represents sending portions of the second configuration data in a second alternating pattern to the second subset of peripheral devices. In some examples, the first alternating pattern and the second alternating pattern may comprise a round robin pattern for sending the portions of the first configuration data and the portions of the second configuration data. For instance, a round robin pattern may refer to sending a first portion to each peripheral device successively before sending a second portion to any peripheral device, and repeating the pattern until all of the portions of configuration data have been transmitted to the relevant peripheral devices. Process 1000 may also include receiving acknowledgment data from the first connected isochronous group indicating that the first subset of peripheral devices is updated based at least in part on the first configuration data, for example.

In some examples, process 1000 may further include receiving priority information from the remote server, the priority information indicating that delivery of the first configuration data to the first subset of peripheral devices is a higher priority than delivery of the second configuration data to the second subset of peripheral devices. Based at least in part on the priority information, process 1000 may include organizing the peripheral devices into the first subset and the second subset. In some implementations, based at least in part on the priority information, process 1000 may include determining a first portion size of the first configuration data to deliver to the first subset of peripheral devices and/or a second portion size of the second configuration data to deliver to the second subset of peripheral devices. In some examples, the first portion size may be larger than the second portion size. Additionally or alternatively, the first alternating pattern may comprise delivery of individual portions of the first configuration data to the first subset of peripheral devices at a higher frequency than delivery of individual portions of the second configuration data to the second subset of peripheral devices. Stated another way, peripheral devices in the first subset may receive more portions of data faster than the peripheral devices in the second subset. In some implementations, process 1000 may include delaying delivery of the second configuration data to the second subset of peripheral devices, based at least in part on the priority information, until the first configuration data have been delivered to the first subset of peripheral devices. In other implementations, process 1000 may include delaying delivery of the second configuration data to the second subset of peripheral devices based at least in part on lack of available bandwidth to concurrently isochronously deliver the first configuration data to the first peripheral device and the second configuration data to the second peripheral device. Stated another way, the central device may prioritize isochronous delivery of the first configuration data to the first peripheral device, rather than try to also isochronously deliver the second configuration data to the second peripheral device, if there is a lack of resources to be able to successfully send both sets of data concurrently.

Figure 11:
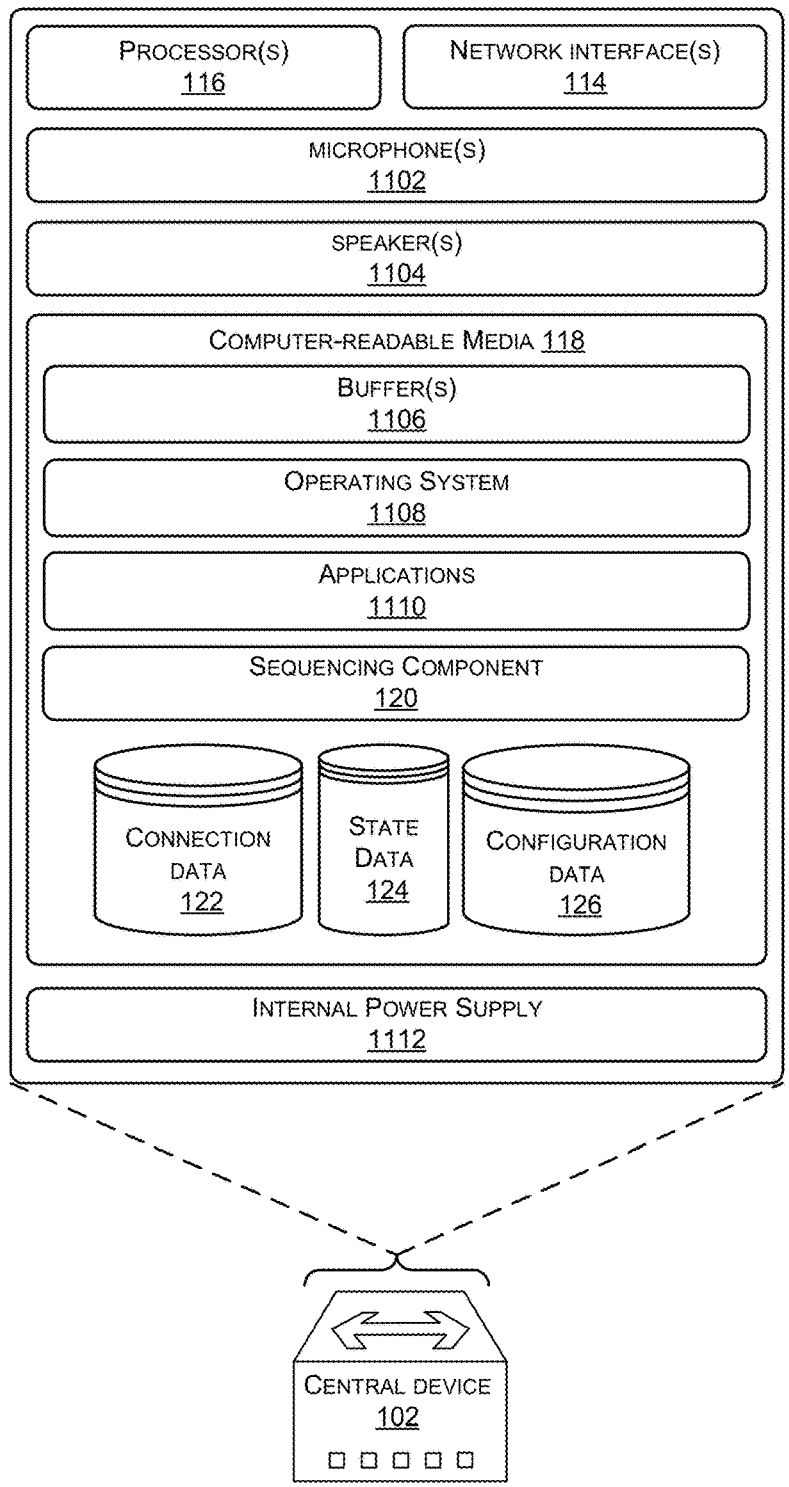
FIG. 11 illustrates a block diagram of an example architecture of a central device that includes components for some of the techniques described herein.

FIG. 11 illustrates a block diagram of an example architecture of a central device 102 that is configured to implement isochronous data transfer techniques. In some examples, the central device 102 may be manifest as a home automation hub, a smart phone, etc.

In the illustrated implementation, the central device 102 includes one or more processors 116 configured to power various components of the central device 102. Further, the central device 102 may include various hardware-based components, such as one or more microphones 1102, and/or one or more in-ear speaker(s) 1104.

The central device 102 may further include computer-readable media 118 which stores various software components, firmware components, or combinations thereof. The components stored in the computer-readable media 118 may comprise computer-readable instructions (e.g., software, firmware, a combination thereof, etc.) which configured the processor(s) 116 to perform various operations. For example, the computer-readable media 118 may include a buffer(s) 1106 for storing, at least temporarily, various types of data. For instance, if the central device 102 is transmitting data, such as to one or more peripheral devices, the buffer(s) 1106 may store portions of the data prior to transmitting the data. By storing data in the buffer(s) 1106, the central device 102 may perform various types of isochronous data transfer techniques, such as transferring the data to multiple peripheral devices in an alternating pattern. The computer-readable media 118 may also store an operating system 1108 configured to manage hardware, software, firmware, and/or other systems and services within and coupled to the central device 102. The computer-readable media 118 may additionally store one or more applications 1110.

The computer-readable media 118 may include sequencing component 120 that, when executed by the processor(s) 116, may perform various types of isochronous data transfer techniques. For instance, the sequencing component 120 may perform the operations in the processes described above, such as processes 400, 700, 800, 900, and 1000. Finally, the computer-readable media 116 may also store the connection data 122, state data 124, and/or configuration data 126 introduced above (FIG. 1).

The central device 102 may be powered, at least partially, by an internal power supply 1112. For instance, the central device 102 may include one or more of batteries, battery banks, supercapacitors, rechargeable batteries, or any other type of internal power supply which may be charged using mains-power and provide power to the central device 102.

The central device 102 may further include the one or more network interfaces 114 that may be utilized by the central device 102 to communicate with other devices over networks, such as the network(s) 106 and/or 112. Generally, the network interface(s) 114 enable the central device 102 to communicate over any type of network, such as a wired network (e.g., USB, Auxiliary, cable etc.), as well as wireless networks (e.g., WiFi, Bluetooth, Personal Area Networks, Wide Area Networks, and so forth). In some examples, the network interface(s) 114 may include a wireless unit coupled to an antenna to facilitate wireless connection to a network. However, the network interface(s) 114 may include any type of component (e.g., hardware, software, firmware, etc.) usable by the central device 102 to communicate over any type of wired or wireless network. The network interface(s) 114 may enable the central device 102 to communicate over networks such as a wireless or Wi-Fi network communications interface, an Ethernet communications interface, a cellular network communications interface, a Bluetooth communications interface, etc., for communications over various types of networks 106 and/or 112, including wide-area network, local-area networks, private networks, public networks etc. In the case of a wireless communications interfaces, such network interface(s) 114 may include radio transceivers and associated control circuits and logic for implementing appropriate communication protocols.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) may possess its own local memory, which also may store program modules, program data, and/or one or more operating systems. The processors(s) may be located in a single device or system, or across disparate devices or systems, which may be owned or operated by various entities.

The computer-readable media described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device, comprising:
   a wireless network interface;
   one or more processors; and
   one or more computer-readable media storing computer-executable instructions that, when executed, cause the one or more processors to perform acts comprising:
      receiving, via the wireless network interface, a message from a remote server, the message including configuration data relevant to a first peripheral device that has previously paired to the electronic device and relevant to a second peripheral device that has previously paired to the electronic device;
      determining that the first peripheral device is currently communicably coupled to the electronic device;
      determining that the second peripheral device is currently communicably coupled to the electronic device;
      initiating a first data link with the first peripheral device;
      initiating a second data link with the second peripheral device;
      sending a first portion of the configuration data to the first peripheral device via the first data link;
      receiving first acknowledgment data from the first peripheral device, the first acknowledgment data regarding receipt of the first portion of the configuration data by the first peripheral device;
      sending, based at least in part on receiving the first acknowledgment data, a second portion of the configuration data to the second peripheral device via the second data link;

receiving second acknowledgment data from the second peripheral device;
sending, based at least in part on receiving the second acknowledgment, a third portion of the configuration data to the first peripheral device via the first data link;
receiving final acknowledgment data from the first peripheral device, the final acknowledgment data indicating that the configuration data, including the first portion, the third portion, and subsequent portions of the configuration data, have been received by the first peripheral device;
sending, based at least in part on receiving the final acknowledgment data, an instruction to the first peripheral device to update using the configuration data; and
terminating the first data link.

2. The electronic device as recited in claim 1, further comprising:
determining that the configuration data is also relevant to a third peripheral device;
receiving, from the remote server, priority information regarding the configuration data;
determining, based at least in part on the priority information, that the third peripheral device is a lower priority than the first peripheral device and that the third peripheral device is a lower priority than the second peripheral device; and
delaying, based at least in part on the third peripheral device being a lower priority, delivery of the configuration data to the third peripheral device until the first peripheral device and the second peripheral device are updated.

3. The electronic device as recited in claim 1, wherein:
the configuration data includes first configuration data and second configuration data;
sending the first portion comprises sending a first data portion of the first configuration data to the first peripheral device;
sending the third portion comprises sending a second data portion of the first configuration data to the first peripheral device; and
sending the second portion comprises sending a first data portion of the second configuration data to the second peripheral device.

4. A method comprising:
receiving a message from a remote server, the message including configuration data relevant to a first peripheral device and a second peripheral device;
determining that both the first peripheral device and the second peripheral device are currently communicably coupled to a central device;
initiating a first data link with the first peripheral device;
initiating a second data link with the second peripheral device;
generating a plurality of portions of the configuration data;
sending the plurality of portions of the configuration data to the first peripheral device and to the second peripheral device, the sending comprising alternating delivery of individual portions, of the plurality of portions, between the first peripheral device and the second peripheral device;
receiving final acknowledgment data from the first peripheral device indicating that each individual portion, of the plurality of the portions, of the configuration data have been received;
sending, based at least in part on the final acknowledgment data, an instruction to the first peripheral device to update using the configuration data; and
terminating the first data link.

5. The method as recited in claim 4, wherein:
the alternating the delivery of the individual portions comprises, in part, sending a first individual portion to the first peripheral device and sending the first individual portion to the second peripheral device before sending a second individual portion to the first peripheral device.

6. The method as recited in claim 4, further comprising:
receiving first acknowledgment data indicating receipt of a first individual portion of the configuration data from the first peripheral device before sending the first individual portion of the configuration data to the second peripheral device; and
receiving second acknowledgment data indicating receipt of the first individual portion of the configuration data from the second peripheral device before sending a second individual portion of the configuration data to the first peripheral device.

7. The method as recited in claim 4, further comprising:
determining that the configuration data are intended for a third peripheral device;
receiving, from the remote server, priority information regarding the configuration data;
determining, based at least in part on the priority information, that the third peripheral device is a lower priority than the first peripheral device and that the third peripheral device is a lower priority than the second peripheral device; and
delaying delivery of the configuration data to the third peripheral device, based at least in part on the third peripheral device being a lower priority, until the first peripheral device and the second peripheral device are updated.

8. The method as recited in claim 4, further comprising:
determining a portion size based at least in part on a total number of peripheral devices receiving the configuration data from the central device,
wherein the generating the plurality of the portions of the configuration data is based at least in part on the portion size.

9. The method as recited in claim 4, further comprising:
receiving, from the remote server, update speed information regarding a desired update speed for the first peripheral device; and
determining a portion size based at least in part on the update speed information,
wherein the generating the plurality of the portions of the configuration data is based at least in part on the portion size.

10. A method comprising:
receiving first configuration data and second configuration data from a remote server;
determining that the first configuration data are relevant to a first subset of peripheral devices associated with a central device;
determining that the second configuration data are relevant to a second subset of peripheral devices;
sending portions of the first configuration data in a first alternating pattern to the first subset of peripheral devices;
sending portions of the second configuration data in a second alternating pattern to the second subset of peripheral devices;

receiving final acknowledgment data from a first peripheral device of the first subset of peripheral devices indicating that each individual portion of the first configuration data has been received;

sending, based at least in part on the final acknowledgment data, an instruction to the first peripheral device to update using the first configuration data; and terminating a first data link over which the configuration data was sent to the first peripheral device.

11. The method as recited in claim 10, further comprising:
receiving priority information from the remote server, the priority information indicating that delivery of the first configuration data to the first subset of peripheral devices is a higher priority than delivery of the second configuration data to the second subset of peripheral devices; and organizing the peripheral devices into the first subset and the second subset based at least in part on the priority information.

12. The method as recited in claim 11, further comprising:
determining, based at least in part on the priority information, a first portion size of the first configuration data to deliver to the first subset of peripheral devices; and determining, based at least in part on the priority information, a second portion size of the second configuration data to deliver to the second subset of peripheral devices, wherein the first portion size is larger than the second portion size.

13. The method as recited in claim 11, wherein the first alternating pattern comprises delivery of individual portions of the first configuration data to the first subset of peripheral devices at a higher frequency than delivery of individual portions of the second configuration data to the second subset of peripheral devices.

14. The method as recited in claim 11, further comprising:
delaying delivery of the second configuration data to the second subset of peripheral devices, based at least in part on the priority information, until the first configuration data have been delivered to the first subset of peripheral devices.

15. The method as recited in claim 11, further comprising:
delaying delivery of the second configuration data to the second subset of peripheral devices based at least in part on lack of available bandwidth to concurrently isochronously deliver the first configuration data to the first subset of peripheral devices and the second configuration data to the second subset of peripheral devices.

16. The method as recited in claim 10, wherein the first alternating pattern and the second alternating pattern comprise a round robin pattern for sending the portions of the first configuration data and the portions of the second configuration data.

17. The method as recited in claim 10, wherein the first alternating pattern and the second alternating pattern comprise different patterns for sending the portions of the first configuration data and the portions of the second configuration data.

18. The method as recited in claim 10, further comprising:
receiving acknowledgment data from the first subset of peripheral devices indicating that the first subset of peripheral devices is updated based at least in part on the first configuration data.

* * * * *